US012572303B2

(12) United States Patent
Ballapuram et al.

(10) Patent No.: US 12,572,303 B2
(45) Date of Patent: Mar. 10, 2026

(54) CACHE MANAGEMENT IN A MEMORY SUBSYSTEM

(71) Applicant: Micron Technology, Inc., Boise, ID (US)

(72) Inventors: Chinnakrishnan Ballapuram, San Jose, CA (US); Akhila Gundu, San Jose, CA (US); Taeksang Song, San Jose, CA (US); Kimberly Judy Lobo, San Jose, CA (US); Saira S. Malik, Lafayette, IN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/612,870

(22) Filed: Mar. 21, 2024

(65) Prior Publication Data

US 2024/0311045 A1 Sep. 19, 2024

Related U.S. Application Data

(63) Continuation of application No. 17/349,629, filed on Jun. 16, 2021, now Pat. No. 11,954,358.

(Continued)

(51) Int. Cl.
*G06F 3/06* (2006.01)
(52) U.S. Cl.
CPC .......... *G06F 3/0656* (2013.01); *G06F 3/0604* (2013.01); *G06F 3/0647* (2013.01);
(Continued)
(58) Field of Classification Search
CPC .... G06F 3/0656; G06F 3/0604; G06F 3/0647; G06F 3/0659; G06F 3/0661; G06F 3/0688
(Continued)

(56) References Cited

U.S. PATENT DOCUMENTS

| 5,875,452 A | 2/1999 | Katayama et al. |
| 6,415,353 B1 * | 7/2002 | Leung ............... G11C 11/40618 711/E12.041 |

(Continued)

FOREIGN PATENT DOCUMENTS

| CN | 105247617 A | 1/2016 |
| CN | 107209718 A | 9/2017 |

(Continued)

OTHER PUBLICATIONS

"Freescale Expands MRAM Product Line Leading the Future of Non-Volatile Memory", A Electronics and Computers, Oct. 25, 2007, pp. 1-2.

(Continued)

*Primary Examiner* — Gautam Sain
(74) *Attorney, Agent, or Firm* — Holland & Hart LLP

(57) ABSTRACT

Methods, systems, and devices for cache management in a memory subsystem are described. An interface controller may include a first buffer and a second buffer. The interface controller may use the first and second buffers to facilitate operating a volatile memory as a cache for a non-volatile memory. During an access operation, the interface controller may use the buffer to transfer data between the volatile memory, non-volatile memory, and another device. In response to the access operation, the interface controller may use the second buffer to transfer second data from the volatile memory to the non-volatile memory.

20 Claims, 8 Drawing Sheets

Related U.S. Application Data

(60) Provisional application No. 63/042,953, filed on Jun. 23, 2020.

(52) U.S. Cl.
CPC .......... *G06F 3/0659* (2013.01); *G06F 3/0661* (2013.01); *G06F 3/0688* (2013.01)

(58) Field of Classification Search
USPC ........................................................ 711/154
See application file for complete search history.

(56) References Cited

U.S. PATENT DOCUMENTS

| | | | | |
|---|---|---|---|---|
| 10,642,505 B1* | 5/2020 | Kuzmin | ................ | G06F 3/0679 |
| 10,802,980 B1* | 10/2020 | Shugaeva | ............. | H04L 47/286 |
| 2002/0161967 A1* | 10/2002 | Kirihata | ............. | G06F 12/0893 |
| | | | | 711/104 |
| 2008/0306723 A1 | 12/2008 | De et al. | | |
| 2012/0254507 A1* | 10/2012 | Chang | ................. | G06F 12/0804 |
| | | | | 711/E12.008 |
| 2015/0003175 A1 | 1/2015 | Ramanujan | | |
| 2015/0143037 A1* | 5/2015 | Smith | ................... | G06F 3/0659 |
| | | | | 711/148 |
| 2016/0224466 A1 | 8/2016 | You | | |
| 2016/0357481 A1 | 12/2016 | Nam et al. | | |
| 2019/0065362 A1 | 2/2019 | Shin et al. | | |
| 2019/0155732 A1 | 5/2019 | Hagersten et al. | | |
| 2021/0041935 A1 | 2/2021 | Hasbun | | |
| 2021/0303199 A1* | 9/2021 | Horspool | ............. | G06F 3/0614 |
| 2023/0307026 A1 | 9/2023 | Ware et al. | | |

FOREIGN PATENT DOCUMENTS

| | | |
|---|---|---|
| CN | 109426453 A | 3/2019 |
| CN | 109815168 A | 5/2019 |
| CN | 110799954 A | 2/2020 |
| WO | 2018/236663 A1 | 12/2018 |

OTHER PUBLICATIONS

Chinese patent office, "CN Notice of Allowance, including Search Report," issued in connection with China Patent Application No. 202110684660.6 dated Mar. 28, 2025 (10 pages total; 5 pages Original & 5 pages machine translation).

Chinese patent office, "China Office Action," issued in connection with China Patent Application No. 202110684660.6 dated Oct. 21, 2024 (48 pages) (29 pages of English Translation and 19 pages of Original Document).

* cited by examiner

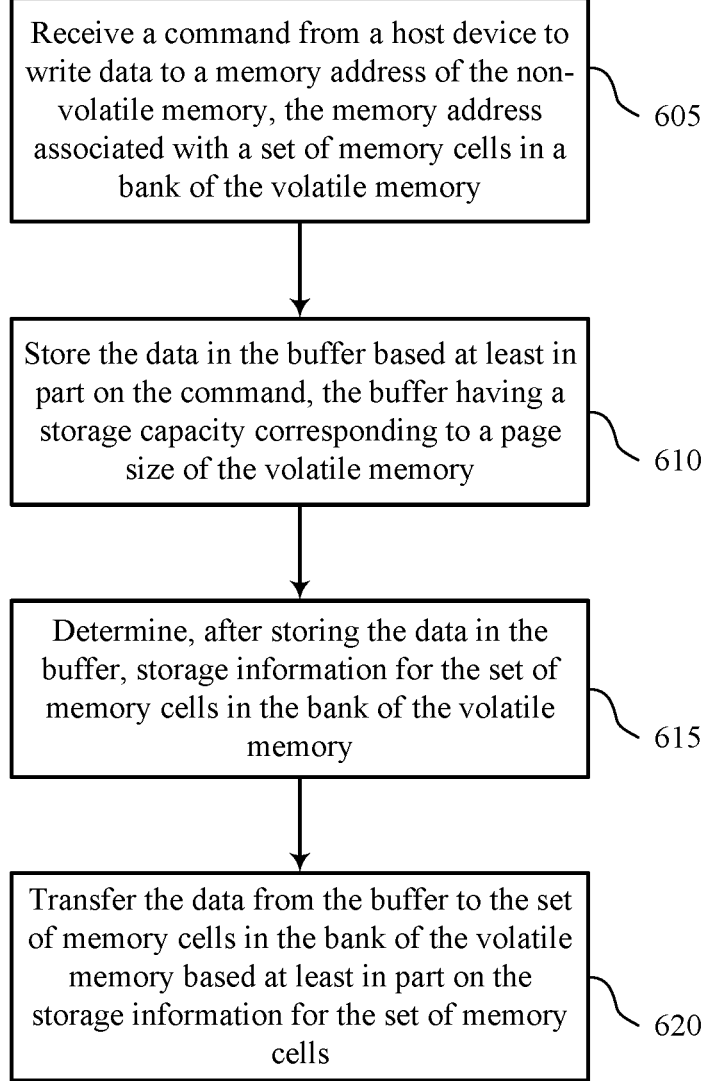

Receive a command from a host device to write data to a memory address of the non-volatile memory, the memory address associated with a set of memory cells in a bank of the volatile memory ⟍ 605

Store the data in the buffer based at least in part on the command, the buffer having a storage capacity corresponding to a page size of the volatile memory ⟍ 610

Determine, after storing the data in the buffer, storage information for the set of memory cells in the bank of the volatile memory ⟍ 615

Transfer the data from the buffer to the set of memory cells in the bank of the volatile memory based at least in part on the storage information for the set of memory cells ⟍ 620

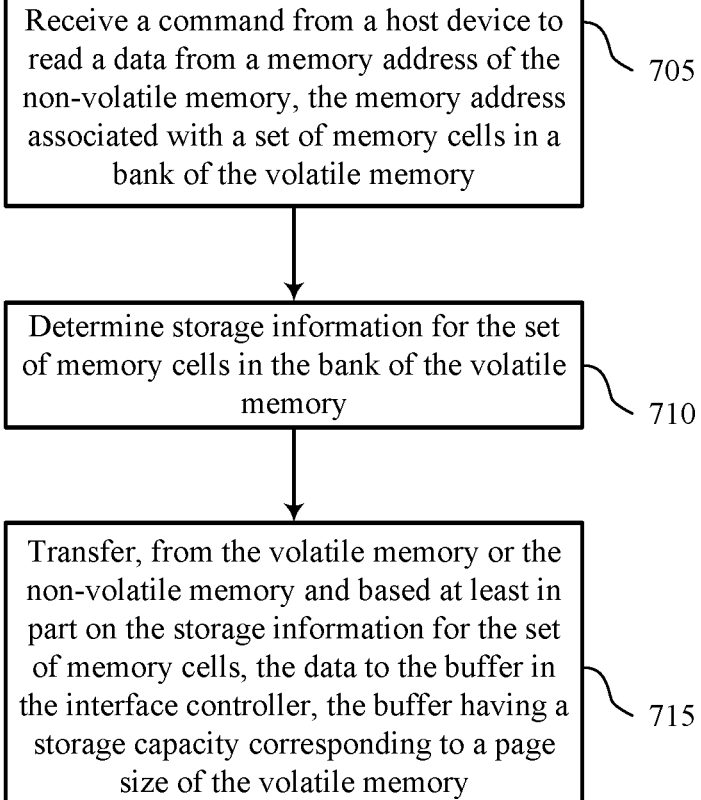

Receive a command from a host device to read a data from a memory address of the non-volatile memory, the memory address associated with a set of memory cells in a bank of the volatile memory ⟩ 705

Determine storage information for the set of memory cells in the bank of the volatile memory ⟩ 710

Transfer, from the volatile memory or the non-volatile memory and based at least in part on the storage information for the set of memory cells, the data to the buffer in the interface controller, the buffer having a storage capacity corresponding to a page size of the volatile memory ⟩ 715

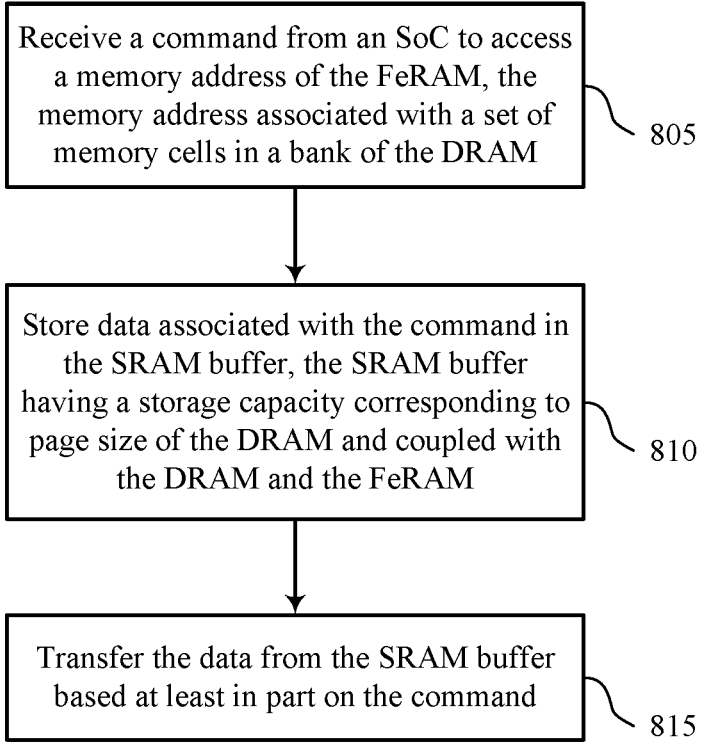

Receive a command from an SoC to access a memory address of the FeRAM, the memory address associated with a set of memory cells in a bank of the DRAM

805

Store data associated with the command in the SRAM buffer, the SRAM buffer having a storage capacity corresponding to page size of the DRAM and coupled with the DRAM and the FeRAM

810

Transfer the data from the SRAM buffer based at least in part on the command

CACHE MANAGEMENT IN A MEMORY SUBSYSTEM

CROSS REFERENCE

The present Application for Patent is a continuation of U.S. patent application Ser. No. 17/349,629 by BALLAPURAM et al., entitled "CACHE MANAGEMENT IN A MEMORY SUBSYSTEM," filed Jun. 16, 2021, which claims the benefit of U.S. Provisional Patent Application No. 63/042,953 by BALLAPURAM et al., entitled "CACHE MANAGEMENT IN A MEMORY SUBSYSTEM," filed Jun. 23, 2020, each of which is assigned to the assignee hereof, and each of which is expressly incorporated by reference herein.

BACKGROUND

The following relates generally to one or more memory systems and more specifically to cache management in a memory subsystem.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

BRIEF DESCRIPTION OF THE DRAWINGS

FIGS. 6 through 8 show flowcharts illustrating a method or methods that support cache management in a memory subsystem in accordance with examples as disclosed herein.

DETAILED DESCRIPTION

A memory system may include one or more memory devices as a main memory (e.g., a primary memory for storing information among other operations) for a host device (e.g., a system on chip (SoC) or processor). For example, a memory system may include a non-volatile memory (e.g., FeRAM) that stores data for the memory system. Compared to volatile memory, the non-volatile memory may provide benefits such as non-volatility, higher capacity, and lower power consumption. However, there may be various incompatibilities or inefficiencies between the non-volatile memory and the host device. For instance, the host device and the non-volatile memory may support different latencies, pages sizes, or communication protocols, among other characteristics.

According to the techniques described herein, incompatibilities or inefficiencies between a host device and a non-volatile memory may be resolved by including a volatile memory in the memory system and operating the volatile memory as a cache. A controller may be included in the memory system to serve as an intermediary between the host device, the volatile memory, and the non-volatile memory, among other components. The controller may include one or more buffers that may facilitate the operation of the volatile memory as a cache. For example, the controller may include a first buffer and a second buffer for each bank of the volatile memory. To streamline transfer processes, among other advantages, the buffers may have storage capacities that correspond to (e.g., are equivalent to) the page size of the volatile memory. The controller may use the first buffer for a bank of volatile memory to store data for transfer between the host device, volatile memory, or non-volatile memory (e.g., during an access process), or any combination thereof. The controller may use the second buffer for the bank of volatile memory to store data for transfer from the volatile memory to the non-volatile memory (e.g., as part of an eviction process that frees up space in the volatile memory for new data).

Features of the disclosure are initially described in the context of a memory system and subsystem as described with reference to FIGS. 1 and 2. Features of the disclosure are described in the context process flows as described with reference to FIGS. 3 and 4. These and other features of the disclosure are further illustrated by and described with reference to an apparatus diagram and flowcharts that relate to cache management in a memory subsystem as described with reference to FIGS. 5-8.

Figure 1:
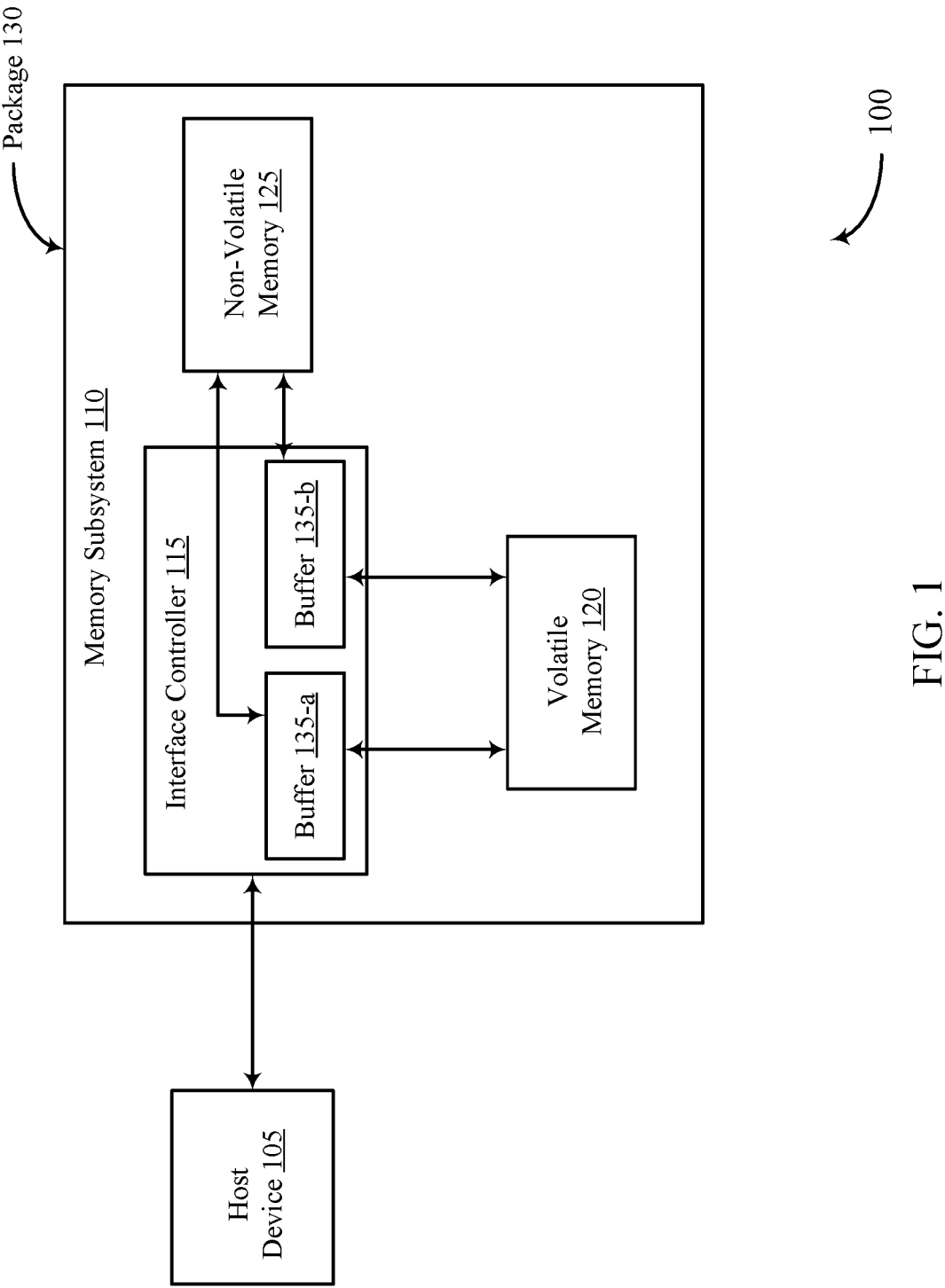
FIG. 1 illustrates an example of a system that supports cache management in a memory subsystem in accordance with examples as disclosed herein.

FIG. 1 illustrates an example of a memory system 100 that supports cache management in a memory subsystem in accordance with examples as disclosed herein. The memory system 100 may be included in an electronic device such a computer or phone. The memory system 100 may include a host device 105 and a memory subsystem 110. The host device 105 may be a processor or system-on-a-chip (SoC) that interfaces with the interface controller 115 as well as other components of the electronic device that includes the memory system 100. The memory subsystem 110 may store and provide access to electronic information (e.g., digital information, data) for the host device 105. The memory subsystem 110 may include an interface controller 115, a volatile memory 120, and a non-volatile memory 125. In some examples, the interface controller 115, the volatile memory 120, and the non-volatile memory 125 may be included in a same physical package such as a package 130. However, the interface controller 115, the volatile memory 120, and the non-volatile memory 125 may be disposed on different, respective dies (e.g., silicon dies).

The devices in the memory system 100 may be coupled by various conductive lines (e.g., traces, printed circuit board (PCB) routing, redistribution layer (RDL) routing) that may enable the communication of information (e.g., commands, addresses, data) between the devices. The conductive lines may make up channels, data buses, command buses, address buses, and the like.

The memory subsystem 110 may be configured to provide the benefits of the non-volatile memory 125 while maintaining compatibility with a host device 105 that supports protocols for a different type of memory, such as the volatile memory 120, among other examples. For example, the non-volatile memory 125 may provide benefits (e.g., relative to the volatile memory 120) such as non-volatility, higher capacity, or lower power consumption. But the host device 105 may be incompatible or inefficiently configured with various aspects of the non-volatile memory 125. For instance, the host device 105 may support voltages, access latencies, protocols, page sizes, etc. that are incompatible with the non-volatile memory 125. To compensate for the incompatibility between the host device 105 and the non-volatile memory 125, the memory subsystem 110 may be configured with the volatile memory 120, which may be compatible with the host device 105 and serve as a cache for the non-volatile memory 125. Thus, the host device 105 may use protocols supported by the volatile memory 120 while benefitting from the advantages of the non-volatile memory 125.

In some examples, the memory system 100 may be included in, or coupled with, a computing device, electronic device, mobile computing device, or wireless device. The device may be a portable electronic device. For example, the device may be a computer, a laptop computer, a tablet computer, a smartphone, a cellular phone, a wearable device, an internet-connected device, or the like. In some examples, the device may be configured for bi-directional wireless communication via a base station or access point. In some examples, the device associated with the memory system 100 may be capable of machine-type communication (MTC), machine-to-machine (M2M) communication, or device-to-device (D2D) communication. In some examples, the device associated with the memory system 100 may be referred to as a user equipment (UE), station (STA), mobile terminal, or the like.

The host device 105 may be configured to interface with the memory subsystem 110 using a first protocol (e.g., low-power double data rate (LPDDR)) supported by the interface controller 115. Thus, the host device 105 may, in some examples, interface with the interface controller 115 directly and the non-volatile memory 125 and the volatile memory 120 indirectly. In alternative examples, the host device 105 may interface directly with the non-volatile memory 125 and the volatile memory 120. The host device 105 may also interface with other components of the electronic device that includes the memory system 100. The host device 105 may be or include an SoC, a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In some examples, the host device 105 may be referred to as a host.

The interface controller 115 may be configured to interface with the volatile memory 120 and the non-volatile memory 125 on behalf of the host device 105 (e.g., based on one or more commands or requests issued by the host device 105). For instance, the interface controller 115 may facilitate the retrieval and storage of data in the volatile memory 120 and the non-volatile memory 125 on behalf of the host device 105. Thus, the interface controller 115 may facilitate data transfer between various subcomponents, such as between at least some of the host device 105, the volatile memory 120, or the non-volatile memory 125. The interface controller 115 may interface with the host device 105 and the volatile memory 120 using the first protocol and may interface with the non-volatile memory 125 using a second protocol supported by the non-volatile memory 125.

The non-volatile memory 125 may be configured to store digital information (e.g., data) for the electronic device that includes the memory system 100. Accordingly, the non-volatile memory 125 may include an array or arrays of memory cells and a local memory controller configured to operate the array(s) of memory cells. In some examples, the memory cells may be or include FeRAM cells (e.g., the non-volatile memory 125 may be FeRAM). The non-volatile memory 125 may be configured to interface with the interface controller 115 using the second protocol that is different than the first protocol used between the interface controller 115 and the host device 105. In some examples, the non-volatile memory 125 may have a longer latency for access operations than the volatile memory 120. For example, retrieving data from the non-volatile memory 125 may take longer than retrieving data from the volatile memory 120. Similarly, writing data to the non-volatile memory 125 may take longer than writing data to the volatile memory 120. In some examples, the non-volatile memory 125 may have a smaller page size than the volatile memory 120, as described herein.

The volatile memory 120 may be configured to operate as a cache for one or more components, such as the non-volatile memory 125. For example, the volatile memory 120 may store information (e.g., data) for the electronic device that includes the memory system 100. Accordingly, the volatile memory 120 may include an array or arrays of memory cells and a local memory controller configured to operate the array(s) of memory cells. In some examples, the memory cells may be or include DRAM cells (e.g., the volatile memory may be DRAM). The non-volatile memory 125 may be configured to interface with the interface controller 115 using the first protocol that is used between the interface controller 115 and the host device 105.

In some examples, the volatile memory 120 may have a shorter latency for access operations than the non-volatile memory 125. For example, retrieving data from the volatile memory 120 may take less time than retrieving data from the non-volatile memory 125. Similarly, writing data to the volatile memory 120 may take less time than writing data to the non-volatile memory 125. In some examples, the volatile memory 120 may have a larger page size than the non-volatile memory 125. For instance, the page size of volatile memory 120 may be 2 kilobytes (2 KB) and the page size of non-volatile memory 125 may be 64 bytes (64 B) or 128 bytes (128 B).

Although the non-volatile memory 125 may be a higher-density memory than the volatile memory 120, accessing the non-volatile memory 125 may take longer than accessing the volatile memory 120 (e.g., due to different architectures and protocols, among other reasons). Accordingly, operating the volatile memory 120 as a cache may reduce latency in the memory system 100. As an example, an access request for data from the host device 105 may be satisfied relatively quickly by retrieving the data from the volatile memory 120 rather than from the non-volatile memory 125. To facilitate operation of the volatile memory 120 as a cache, the interface controller 115 may include multiple buffers 135. The buffers 135 may be disposed on the same die as the interface controller 115 and may be configured to temporarily store data for transfer between the volatile memory 120, the non-volatile memory 125, or the host device 105 (or any combination thereof) during one or more access operations (e.g., storage and retrieval operations).

An access operation may also be referred to as an access process or access procedure and may involve one or more sub-operations that are performed by one or more of the components of the memory subsystem 110. Examples of access operations may include storage operations in which data provided by the host device 105 is stored (e.g., written to) in the volatile memory 120 or the non-volatile memory 125 (or both), and retrieval operations in which data requested by the host device 105 is obtained (e.g., read) from the volatile memory 120 or the non-volatile memory 125 and is returned to the host device 105.

To store data in the memory subsystem 110, the host device 105 may initiate a storage operation (or "storage process") by transmitting a storage command (also referred to as a storage request, a write command, or a write request) to the interface controller 115. The storage command may target a set of non-volatile memory cells in the non-volatile memory 125. In some examples, a set of memory cells may also be referred to as a portion of memory. The host device 105 may also provide the data to be written to the set of non-volatile memory cells to the interface controller 115. The interface controller 115 may temporarily store the data in the buffer 135-a. After storing the data in the buffer 135-a, the interface controller 115 may transfer the data from the buffer 135-a to the volatile memory 120 or the non-volatile memory 125 or both. In write-through mode, the interface controller 115 may transfer the data to both the volatile memory 120 and the non-volatile memory 125. In write-back mode, the interface controller 115 may only transfer the data to the volatile memory 120.

In either mode, the interface controller 115 may identify an appropriate set of one or more volatile memory cells in the volatile memory 120 for storing the data associated with the storage command. To do so, the interface controller 115 may implement set-associative mapping in which each set (e.g., block) of one or more non-volatile memory cells in the non-volatile memory 125 may be mapped to multiple sets of volatile memory cells in the volatile memory 120. For instance, the interface controller 115 may implement n-way associative mapping which allows data from a set of non-volatile memory cells to be stored in one of n sets of volatile memory cells in the volatile memory 120. Thus, the interface controller 115 may manage the volatile memory 120 as a cache for the non-volatile memory 125 by referencing the n sets of volatile memory cells associated with a targeted set of non-volatile memory cells. As used herein, a "set" of objects may refer to one or more of the objects unless otherwise described or noted. Although described with reference to set-associative mapping, the interface controller 115 may manage the volatile memory 120 as a cache by implementing one or more other types of mapping such as direct mapping or associative mapping, among other examples.

After determining which n sets of volatile memory cells are associated with the targeted set of non-volatile memory cells, the interface controller 115 may store the data in one or more of the n sets of volatile memory cells. This way, a subsequent retrieval command from the host device 105 for the data can be efficiently satisfied by retrieving the data from the lower-latency volatile memory 120 instead of retrieving the data from the higher-latency non-volatile memory 125. The interface controller 115 may determine which of the n sets of the volatile memory 120 to store the data based on one or more parameters associated with the data stored in the n sets of the volatile memory 120, such as the validity, age, or modification status of the data. Thus, a storage command by the host device 105 may be wholly (e.g., in write-back mode) or partially (e.g., in write-through mode) satisfied by storing the data in the volatile memory 120. To track the data stored in the volatile memory 120, the interface controller 115 may store for one or more sets of volatile memory cells (e.g., for each set of volatile memory cells) a tag address that indicates the non-volatile memory cells with data stored in a given set of volatile memory cells.

To retrieve data from the memory subsystem 110, the host device 105 may initiate a retrieval operation (also referred to as a retrieval process) by transmitting a retrieval command (also referred to as a retrieval request, a read command, or a read request) to the interface controller 115. The retrieval command may target a set of one or more non-volatile memory cells in the non-volatile memory 125. Upon receiving the retrieval command, the interface controller 115 may check for the requested data in the volatile memory 120. For instance, the interface controller 115 may check for the requested data in the n sets of volatile memory cells associated with the targeted set of non-volatile memory cells. If one of the n sets of volatile memory cells stores the requested data (e.g., stores data for the targeted set of non-volatile memory cells), the interface controller 115 may transfer the data from the volatile memory 120 to the buffer 135-a (e.g., in response to determining that one of the n sets of volatile memory cells stores the requested data, as described in FIGS. 4 and 5) so that it can be transmitted to the host device 105. The term "hit" may be used to refer to the scenario where the volatile memory 120 stores data requested by the host device 105. If the n sets of one or more volatile memory cells do not store the requested data (e.g., the n sets of volatile memory cells store data for a set of non-volatile memory cells other than the targeted set of non-volatile memory cells), the interface controller 115 may transfer the requested data from the non-volatile memory 125 to the buffer 135-a (e.g., in response to determining that the n sets of volatile memory cells do not store the requested data, as described with reference to FIGS. 4 and 5) so that it can be transmitted to the host device 105. The term "miss" may be used to refer to the scenario where the volatile memory 120 does not store data requested by the host device 105.

In a miss scenario, after transferring the requested data to the buffer 135-a, the interface controller 115 may transfer the requested data from the buffer 135-a to the volatile memory 120 so that subsequent read requests for the data can be satisfied by the volatile memory 120 instead of the non-volatile memory 125. For example, the interface controller 115 may store the data in one of the n sets of volatile memory cells associated with the targeted set of non-volatile memory cells. But the n sets of volatile memory cells may already be storing data for other sets of non-volatile memory cells. So, to preserve this other data, the interface controller 115 may transfer the other data to the buffer 135-*b* so that it can be transferred to the non-volatile memory 125 for storage. Such a process may be referred to as "eviction" and the data transferred from the volatile memory 120 to the buffer 135-*b* may be referred to as "victim" data. In some cases, the interface controller 115 may transfer a subset of the victim data from the buffer 135-*b* to the non-volatile memory 125. For example, the interface controller 115 may transfer one or more subsets of victim data that have changed since the data was initially stored in the non-volatile memory 125. Data that is inconsistent between the volatile memory 120 and the non-volatile memory 125 (e.g., due to an update in one memory and not the other) may be referred to in some cases as "modified" or "dirty" data. In some examples (e.g., when interface controller operates in one mode such as a write-back mode), dirty data may be data that is present in the volatile memory 120 but not present in the non-volatile memory 125.

Figure 2:
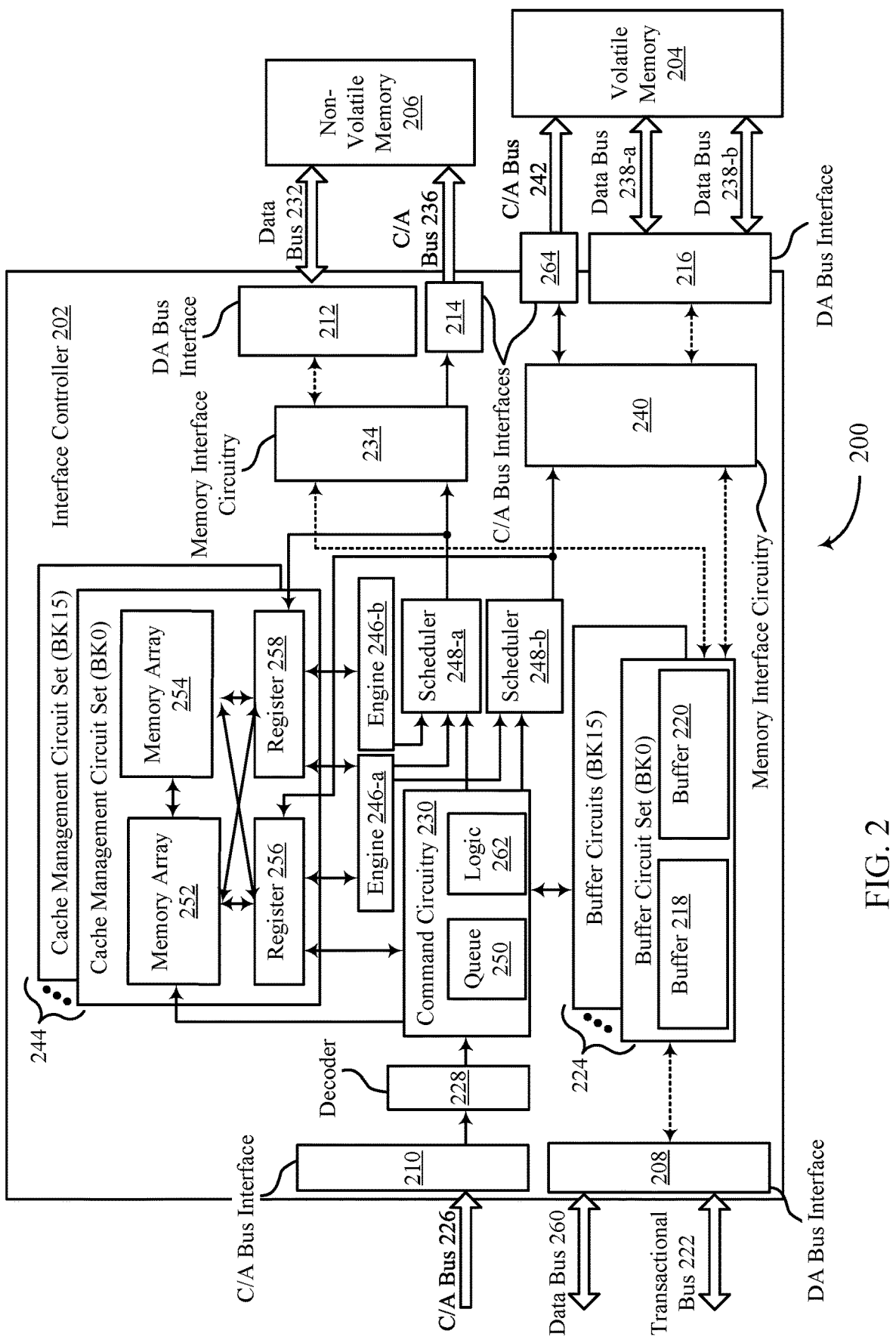
FIG. 2 illustrates an example of a memory subsystem that supports cache management in accordance with examples as disclosed herein.

FIG. 2 illustrates an example of a memory subsystem 200 that supports cache management in a memory subsystem in accordance with examples as disclosed herein. The memory subsystem 200 may be an example of the memory subsystem 110 described with reference to FIG. 1. Accordingly, the memory subsystem 200 may interact with a host device as described with reference to FIG. 1. The memory subsystem 200 may include an interface controller 202, a volatile memory 204, and a non-volatile memory 206, which may be examples of the interface controller 115, the volatile memory 120, and the non-volatile memory 125, respectively, as described with reference to FIG. 1. Thus, the interface controller 202 may interface with the volatile memory 204 and the non-volatile memory 206 on behalf of the host device as described with reference to FIG. 1. For example, the interface controller 202 may operate the volatile memory 204 as a cache for the non-volatile memory 206. Operating the volatile memory 204 as the cache may allow subsystem to provide the benefits of the non-volatile memory 206 (e.g., non-volatile, high-density storage) while maintaining compatibility with a host device that supports a different protocol than the non-volatile memory 206.

In FIG. 2, dashed lines between components represent the flow of data or communication paths for data and solid lines between components represent the flow of commands or communication paths for commands. In some cases, the memory subsystem 200 is one of multiple similar or identical subsystems that may be included in an electronic device. Each subsystem may be referred to as a slice and may be associated with a respective channel of a host device in some examples.

The non-volatile memory 206 may be configured to operate as a main memory (e.g., memory for long-term data storage) for a host device. In some cases, the non-volatile memory 206 may include one or more arrays of FeRAM cells. Each FeRAM cell may include a selection component and a ferroelectric capacitor and may be accessed by applying appropriate voltages to one or more access lines such as word lines, plates lines, and digit lines. In some examples, a subset of FeRAM cells coupled with to an activated word line may be sensed, for example concurrently or simultaneously, without having to sense all FeRAM cells coupled with the activated word line. Accordingly, a page size for an FeRAM array may be different than (e.g., smaller than) a DRAM page size. In the context of a memory device, a page may refer to the memory cells in a row (e.g., a group of the memory cells that have a common row address) and a page size may refer to the number of memory cells or column addresses in a row, or the number of column addresses accessed during an access operation. Alternatively, a page size may refer to a size of data handled by various interfaces. In some cases, different memory device types may have different page sizes. For example, a DRAM page size (e.g., 2 kB) may be a superset of a non-volatile memory (e.g., FeRAM) page size (e.g., 64 B).

A smaller page size of an FeRAM array may provide various efficiency benefits, as an individual FeRAM cell may require more power to read or write than an individual DRAM cell. For example, a smaller page size for an FeRAM array may facilitate effective energy usage because a smaller number of FeRAM cells may be activated when an associated change in information is minor. In some examples, the page size for an array of FeRAM cells may vary, for example dynamically (e.g., during operation of the array of FeRAM cells) depending on the nature of data and command utilizing FeRAM operation.

Although an individual FeRAM cell may require more power to read or write than an individual DRAM cell, an FeRAM cell may maintain its stored logic state for an extended period of time in the absence of an external power source, as the ferroelectric material in the FeRAM cell may maintain a non-zero electric polarization in the absence of an electric field. Therefore, including an FeRAM array in the non-volatile memory 206 may provide efficiency benefits relative to volatile memory cells (e.g., DRAM cells in the volatile memory 204), as it may reduce or eliminate requirements to perform refresh operations.

The volatile memory 204 may be configured to operate as a cache for the non-volatile memory 206. In some cases, the volatile memory 204 may include one or more arrays of DRAM cells. Each DRAM cell may include a capacitor that includes a dielectric material to store a charge representative of the programmable state. The memory cells of the volatile memory 204 may be logically grouped or arranged into one or more memory banks (as referred to herein as "banks"). For example, volatile memory 204 may include sixteen banks. The memory cells of a bank may be arranged in a grid or an array of intersecting columns and rows and each memory cell may be accessed or refreshed by applying appropriate voltages to the digit line (e.g., column line) and word line (e.g., row line) for that memory cell. The rows of a bank may be referred to pages, and the page size may refer to the number of columns or memory cells in a row. As noted, the page size of the volatile memory 204 may be different than (e.g., larger than) the page size of the non-volatile memory 206.

The interface controller 202 may include various circuits for interfacing (e.g., communicating) with other devices, such as a host device, the volatile memory 204, and the non-volatile memory 206. For example, the interface controller 202 may include a data (DA) bus interface 208, a command and address (C/A) bus interface 210, a data bus interface 212, a C/A bus interface 214, a data bus interface 216, and a C/A bus interface 264. The data bus interfaces may support the communication of information using one or more communication protocols. For example, the data bus interface 208, the C/A bus interface 210, the data bus interface 216, and the C/A bus interface 264 may support information that is communicated using a first protocol (e.g., LPDDR signaling), whereas the data bus interface 212 and the C/A bus interface 214 may support information communicated using a second protocol. Thus, the various bus interfaces coupled with the interface controller 202 may support different amounts of data or data rates.

The data bus interface 208 may be coupled with the data bus 260, the transactional bus 222, and the buffer circuitry 224. The data bus interface 208 may be configured to transmit and receive data over the data bus 260 and control information (e.g., acknowledgements/negative acknowledgements) or metadata over the transactional bus 222. The data bus interface 208 may also be configured to transfer data between the data bus 260 and the buffer circuitry 224. The data bus 260 and the transactional bus 222 may be coupled with the interface controller 202 and the host device such that a conductive path is established between the interface controller 202 and the host device. In some examples, the pins of the transactional bus 222 may be referred to as data mask inversion (DMI) pins. Although shown with one data bus 260 and one transactional bus 222, there may be any number of data buses 260 and any number of transactional buses 222 coupled with one or more data bus interfaces 208.

The C/A bus interface 210 may be coupled with the C/A bus 226 and the decoder 228. The C/A bus interface 210 may be configured to transmit and receive commands and addresses over the C/A bus 226. The commands and addresses received over the C/A bus 226 may be associated with data received or transmitted over the data bus 260. The C/A bus interface 210 may also be configured to transmit commands and addresses to the decoder 228 so that the decoder 228 can decode the commands and relay the decoded commands and associated addresses to the command circuitry 230.

The data bus interface 212 may be coupled with the data bus 232 and the memory interface circuitry 234. The data bus interface 212 may be configured to transmit and receive data over the data bus 232, which may be coupled with the non-volatile memory 206. The data bus interface 212 may also be configured to transfer data between the data bus 232 and the memory interface circuitry 234. The C/A bus interface 214 may be coupled with the C/A bus 236 and the memory interface circuitry 234. The C/A bus interface 214 may be configured to receive commands and addresses from the memory interface circuitry 234 and relay the commands and the addresses to the non-volatile memory 206 (e.g., to a local controller of the non-volatile memory 206) over the C/A bus 236. The commands and the addresses transmitted over the C/A bus 236 may be associated with data received or transmitted over the data bus 232. The data bus 232 and the C/A bus 236 may be coupled with the interface controller 202 and the non-volatile memory 206 such that conductive paths are established between the interface controller 202 and the non-volatile memory 206.

The data bus interface 216 may be coupled with the data buses 238 and the memory interface circuitry 240. The data bus interface 216 may be configured to transmit and receive data over the data buses 238, which may be coupled with the volatile memory 204. The data bus interface 216 may also be configured to transfer data between the data buses 238 and the memory interface circuitry 240. The C/A bus interface 264 may be coupled with the C/A bus 242 and the memory interface circuitry 240. The C/A bus interface 264 may be configured to receive commands and addresses from the memory interface circuitry 240 and relay the commands and the addresses to the volatile memory 204 (e.g., to a local controller of the volatile memory 204) over the C/A bus 242. The commands and addresses transmitted over the C/A bus 242 may be associated with data received or transmitted over the data buses 238. The data bus 238 and the C/A bus 242 may be coupled with the interface controller 202 and the volatile memory 204 such that conductive paths are established between the interface controller 202 and the volatile memory 204.

In addition to buses and bus interfaces for communicating with coupled devices, the interface controller 202 may include circuitry for operating the non-volatile memory 206 as a main memory and the volatile memory 204 as a cache. For example, the interface controller 202 may include command circuitry 230, buffer circuitry 224, cache management circuitry 244, one or more engines 246, and one or more schedulers 248.

The command circuitry 230 may be coupled with the buffer circuitry 224, the decoder 228, the cache management circuitry 244, and the schedulers 248, among other components. The command circuitry 230 may be configured to receive command and address information from the decoder 228 and store the command and address information in the queue 250. The command circuitry 230 may include logic 262 that processes command information (e.g., from a host device) and storage information from other components (e.g., the cache management circuitry 244, the buffer circuitry 224) and uses that information to generate one or more commands for the schedulers 248. The command circuitry 230 may also be configured to transfer address information (e.g., address bits) to the cache management circuitry 244. In some examples, the logic 26 2522 may be a circuit configured to operate as a finite state machine (FSM).

The buffer circuitry 224 may be coupled with the data bus interface 208, the command circuitry 230, the memory interface circuitry 234, and the memory interface circuitry 234. The buffer circuitry 224 may include a set of one or more buffer circuits for at least some banks, if not each bank, of the volatile memory 204. The buffer circuitry 224 may also include components (e.g., a memory controller) for accessing the buffer circuits. In one example, the volatile memory 204 may include sixteen banks and the buffer circuitry 224 may include sixteen sets of buffer circuits. Each set of the buffer circuits may be configured to store data from or for (or both) a respective bank of the volatile memory 204. As an example, the buffer circuit set for bank 0 (BK0) may be configured to store data from or for (or both) the first bank of the volatile memory 204 and the buffer circuit for bank 15 (BK15) may be configured to store data from or for (or both) the sixteenth bank of the volatile memory 204.

Each set of buffer circuits in the buffer circuitry 224 may include a pair of buffers. The pair of buffers may include one buffer (e.g., an open page data (OPD) buffer) configured to store data targeted by an access command (e.g., a storage command or retrieval command) from the host device and another buffer (e.g., a victim page data (VPD) buffer) configured to store data for an eviction process that results from the access command. For example, the buffer circuit set for BK0 may include the buffer 218 and the buffer 220, which may be examples of buffer 135-*a* and 135-*b*, respectively. The buffer 218 may be configured to store BK0 data that is targeted by an access command from the host device. And the buffer 220 may be configured to store data that is transferred from BK0 as part of an eviction process triggered by the access command. Each buffer in a buffer circuit set may be configured with a size (e.g., storage capacity) that corresponds to a page size of the volatile memory 204. For example, if the page size of the volatile memory 204 is 2 KB, the size of each buffer may be 2 kB. Thus, the size of the buffer may be equivalent to the page size of the volatile memory 204 in some examples.

The cache management circuitry 244 may be coupled with the command circuitry 230, the engines 246, and the schedulers 248, among other components. The cache management circuitry 244 may include a cache management circuit set for one or more banks (e.g., each bank) of volatile memory. As an example, the cache management circuitry 244 may include sixteen cache management circuit sets for BK0 through BK15. Each cache management circuit set may include two memory arrays that may be configured to store storage information for the volatile memory 204. As an example, the cache management circuit set for BK0 may include a memory array 252 (e.g., a CDRAM Tag Array (CDT-TA)) and a memory array 254 (e.g., a CDRAM Valid (CDT-V) array), which may be configured to store storage information for BK0. The memory arrays may also be referred to as arrays or buffers in some examples. In some cases, the memory arrays may be or include volatile memory cells, such as SRAM cells.

Storage information may include content information, validity information, or dirty information (or any combination thereof) associated with the volatile memory 204. Content information (which may also be referred to as tag information or address information) may indicate which data is stored in a set of volatile memory cells. For example, the content information (e.g., a tag address) for a set of one or more volatile memory cells may indicate which set of one or more non-volatile memory cells currently has data stored in the set of one or more volatile memory cells. Validity information may indicate whether the data stored in a set of volatile memory cells is actual data (e.g., data having an intended order or form) or placeholder data (e.g., data being random or dummy, not having an intended or important order). And dirty information may indicate whether the data stored in a set of one or more volatile memory cells of the volatile memory 204 is different than corresponding data stored in a set of one or more non-volatile memory cells of the non-volatile memory 206. For example, dirty information may indicate whether data stored in a set of volatile memory cells has been updated relative to data stored in the non-volatile memory 206.

The memory array 252 may include memory cells that store storage information (e.g., content and validity information) for an associated bank (e.g., BK0) of the volatile memory 204. The storage information may be stored on a per-page basis (e.g., there may be respective storage information for each page of the associated non-volatile memory bank). The interface controller 202 may check for requested data in the volatile memory 204 by referencing the storage information in the memory array 252. For instance, the interface controller 202 may receive, from a host device, a retrieval command for data in a set of non-volatile memory cells in the non-volatile memory 206. The interface controller 202 may use a set of one or more address bits (e.g., a set of row address bits) targeted by the access request to reference the storage information in the memory array 252. For instance, using set-associative mapping, the interface controller 202 may reference the content information in the memory array 252 to determine which set of volatile memory cells, if any, stores the requested data.

In addition to storing content information for volatile memory cells, the memory array 252 may also store validity information that indicates whether the data in a set of volatile memory cells is actual data (also referred to as valid data) or random data (also referred to as invalid data). For example, the volatile memory cells in the volatile memory 204 may initially store random data and continue to do so until the volatile memory cells are written with data from a host device or the non-volatile memory 206. To track which data is valid, the memory array 252 may be configured to set a bit for each set of volatile memory cells when actual data is stored in that set of volatile memory cells. This bit may be referred to a validity bit or a validity flag. As with the content information, the validity information stored in the memory array 252 may be stored on a per-page basis. Thus, each validity bit may indicate the validity of data stored in an associated page in some examples.

The memory array 254 may be similar to the memory array 252 and may also include memory cells that store validity information for a bank (e.g., BK0) of the volatile memory 204 that is associated with the memory array 252. However, the validity information stored in the memory array 254 may be stored on a sub-block basis as opposed to a per-page basis for the memory array 252. For example, the validity information stored in the memory cells of the memory array 254 may indicate the validity of data for subsets of volatile memory cells in a set (e.g., page) of volatile memory cells. As an example, the validity information in the memory array 254 may indicate the validity of each subset (e.g., 64 B) of data in a page of data stored in BK0 of the volatile memory 204. Storing content information and validity information on a per-page basis in the memory array 252 may allow the interface controller 202 to quickly and efficiently determine whether there is a hit or miss for data in the volatile memory 204. Storing validity information on a sub-block basis may allow the interface controller 202 to determine which subsets of data to preserve in the non-volatile memory 206 during an eviction process.

Each cache management circuit set may also include a respective pair of registers coupled with the command circuitry 230, the engines 246, the memory interface circuitry 234, the memory interface circuitry 240, and the memory arrays for that cache management circuit set, among other components. For example, a cache management circuit set may include a first register (e.g., a register 256 which may be an open page tag (OPT) register) configured to receive storage information (e.g., one or more bits of tag information, validity information, or dirty information) from the memory array 252 or the scheduler 248-*b* or both. The cache management circuitry set may also include a second register (e.g., a register 258 which may be a victim page tag (VPT) register) configured to receive storage information from the memory array 254 and the scheduler 248-*a* or both. The information in the register 256 and the register 258 may be transferred to the command circuitry 230 and the engines 246 to enable decision-making by these components. For example, the command circuitry 230 may issue commands for reading the non-volatile memory 206 or the volatile memory 204 based on content information from the register 256.

The engine 246-*a* may be coupled with the register 256, the register 258, and the schedulers 248. The engine 246-*a* may be configured to receive storage information from various components and issue commands to the schedulers 248 based on the storage information. For example, when the interface controller 202 is in a first mode such as a write-through mode, the engine 246-*a* may issue commands to the scheduler 248-*b* and in response the scheduler 248-*b* to initiate or facilitate the transfer of data from the buffer 218 to both the volatile memory 204 and the non-volatile memory 206. Alternatively, when the interface controller 202 is in a second mode such as a write-back mode, the engine 246-*a* may issue commands to the scheduler 248-*b* and in response the scheduler 248-*b* may initiate or facilitate the transfer of data from the buffer 218 to the volatile memory 204. In the event of a write-back operation, the data stored in the volatile memory 204 may eventually be transferred to the non-volatile memory 206 during a subsequent eviction process.

The engine 246-b may be coupled with the register 258 and the scheduler 248-a. The engine 246-b may be configured to receive storage information from the register 258 and issue commands to the scheduler 248-a based on the storage information. For instance, the engine 246-b may issue commands to the scheduler 248-a to initiate or facilitate transfer of dirty data from the buffer 220 to the non-volatile memory 206 (e.g., as part of an eviction process). If the buffer 220 holds a set of data transferred from the volatile memory 204 (e.g., victim data), the engine 246-b may indicate which one or more subsets (e.g., which 64 B) of the set of data in the buffer 220 should be transferred to the non-volatile memory 206.

The scheduler 248-a may be coupled with various components of the interface controller 202 and may facilitate accessing the non-volatile memory 206 by issuing commands to the memory interface circuitry 234. The commands issued by the scheduler 248-a may be based on commands from the command circuitry 230, the engine 246-a, the engine 246-b, or a combination of these components. Similarly, the scheduler 248-b may be coupled with various components of the interface controller 202 and may facilitate accessing the volatile memory 204 by issuing commands to the memory interface circuitry 240. The commands issued by the scheduler 248-b may be based on commands from the command circuitry 230 or the engine 246-a, or both.

The memory interface circuitry 234 may communicate with the non-volatile memory 206 via one or more of the data bus interface 212 and the C/A bus interface 214. For example, the memory interface circuitry 234 may prompt the C/A bus interface 214 to relay commands issued by the memory interface circuitry 234 over the C/A bus 236 to a local controller in the non-volatile memory 206. And the memory interface circuitry 234 may transmit to, or receive data from, the non-volatile memory 206 over the data bus 232. In some examples, the commands issued by the memory interface circuitry 234 may be supported by the non-volatile memory 206 but not the volatile memory 204 (e.g., the commands issued by the memory interface circuitry 234 may be different than the commands issued by the memory interface circuitry 240).

The memory interface circuitry 240 may communicate with the volatile memory 204 via one or more of the data bus interface 216 and the C/A bus interface 264. For example, the memory interface circuitry 240 may prompt the C/A bus interface 264 to relay commands issued by the memory interface circuitry 240 over the C/A bus 242 to a local controller of the volatile memory 204. And the memory interface circuitry 240 may transmit to, or receive data from, the volatile memory 204 over one or more data buses 238. In some examples, the commands issued by the memory interface circuitry 240 may be supported by the volatile memory 204 but not the non-volatile memory 206 (e.g., the commands issued by the memory interface circuitry 240 may be different than the commands issued by the memory interface circuitry 234).

Together, the components of the interface controller 202 may operate the non-volatile memory 206 as a main memory and the volatile memory 204 as a cache. Such operation may be prompted by one or more access commands (e.g., read/retrieval commands/requests and write/storage commands/requests) received from a host device.

In some examples, the interface controller 202 may receive a storage command from the host device. The storage command may be received over the C/A bus 226 and transferred to the command circuitry 230 via one or more of the C/A bus interface 210 and the decoder 228. The storage command may include or be accompanied by address bits that target a memory address of the non-volatile memory 206. The data to be stored may be received over the data bus 260 and transferred to the buffer 218 via the data bus interface 208. In a write-through mode, the interface controller 202 may transfer the data to both the non-volatile memory 206 and the volatile memory 204. In a write-back mode, the interface controller 202 may transfer the data to only the volatile memory 204. In either mode, the interface controller 202 may first check to see if the volatile memory 204 has memory cells available to store the data. To do so, the command circuitry 230 may reference the memory array 252 (e.g., using a set of the memory address bits) to determine whether one or more of the n sets (e.g., pages) of volatile memory cells associated with the memory address are empty (e.g., store random or invalid data). In some cases, a set of volatile memory cells in the volatile memory 204 may be referred to as a line or cache line.

If one of the n associated sets of volatile memory cells is available for storing information, the interface controller 202 may transfer the data from the buffer 218 to the volatile memory 204 for storage in that set of volatile memory cells. But if no associated sets of volatile memory cells are empty, the interface controller 202 may initiate an eviction process to make room for the data in the volatile memory 204. The eviction process may involve transferring the old data (e.g., existing data) in one of the n associated sets of volatile memory cells to the buffer 220. The dirty information for the old data may also be transferred to the memory array 254 or register 258 for identification of dirty subsets of the old data. After the old data is stored in the buffer 220, the new data can be transferred from the buffer 218 to the volatile memory 204 and the old data can be transferred from the buffer 220 to the non-volatile memory 206. In some cases, dirty subsets of the old data are transferred to the non-volatile memory 206 and clean subsets (e.g., unmodified subsets) are discarded. The dirty subsets may be identified by the engine 246-b based on dirty information transferred (e.g., from the volatile memory 204) to the memory array 254 or register 258 during the eviction process.

In another example, the interface controller 202 may receive a retrieval command from the host device. The retrieval command may be received over the C/A bus 225 and transferred to the command circuitry 230 via one or more of the C/A bus interface 210 and the decoder 228. The retrieval command may include address bits that target a memory address of the non-volatile memory 206. Before attempting to access the targeted memory address of the non-volatile memory 206, the interface controller 202 may check to see if the volatile memory 204 stores the data. To do so, the command circuitry 230 may reference the memory array 252 (e.g., using a set of the memory address bits) to determine whether one or more of the n sets of volatile memory cells associated with the memory address stores the requested data. If the requested data is stored in the volatile memory 204, the interface controller 202 may transfer the requested data to the buffer 218 for transmission to the host device over the data bus 260.

If the requested data is not stored in the volatile memory 204, the interface controller 202 may retrieve the data from the non-volatile memory 206 and transfer the data to the buffer 218 for transmission to the host device over the data bus 260. Additionally, the interface controller 202 may transfer the requested data from the buffer 218 to the volatile memory 204 so that the data can be accessed with a lower latency during a subsequent retrieval operation. Before transferring the requested data, however, the interface controller 202 may first determine whether one or more of the n associated sets of volatile memory cells are available to store the requested data. The interface controller 202 may determine the availability of the n associated sets of volatile memory cells by communicating with the related cache management circuit set. If an associated set of volatile memory cells is available, the interface controller 202 may transfer the data in the buffer 218 to the volatile memory 204 without performing an eviction process. Otherwise, the interface controller 202 may transfer the data from the buffer 218 to the volatile memory 204 after performing an eviction process.

The memory subsystem 200 may be implemented in one or more configurations, including one-chip versions and multi-chip versions. A multi-chip version may include one or more constituents of the memory subsystem 200, including the interface controller 202, the volatile memory 204, and the non-volatile memory 206 (among other constituents or combinations of constituents), on a chip that is separate from a chip that includes one or more other constituents of the memory subsystem 200. For example, in one multi-chip version, respective separate chips may include each of the interface controller 202, the volatile memory 204, and the non-volatile memory 206. In contrast, a one-chip version may include the interface controller 202, the volatile memory 204, and the non-volatile memory 206 on a single chip.

Figure 3:
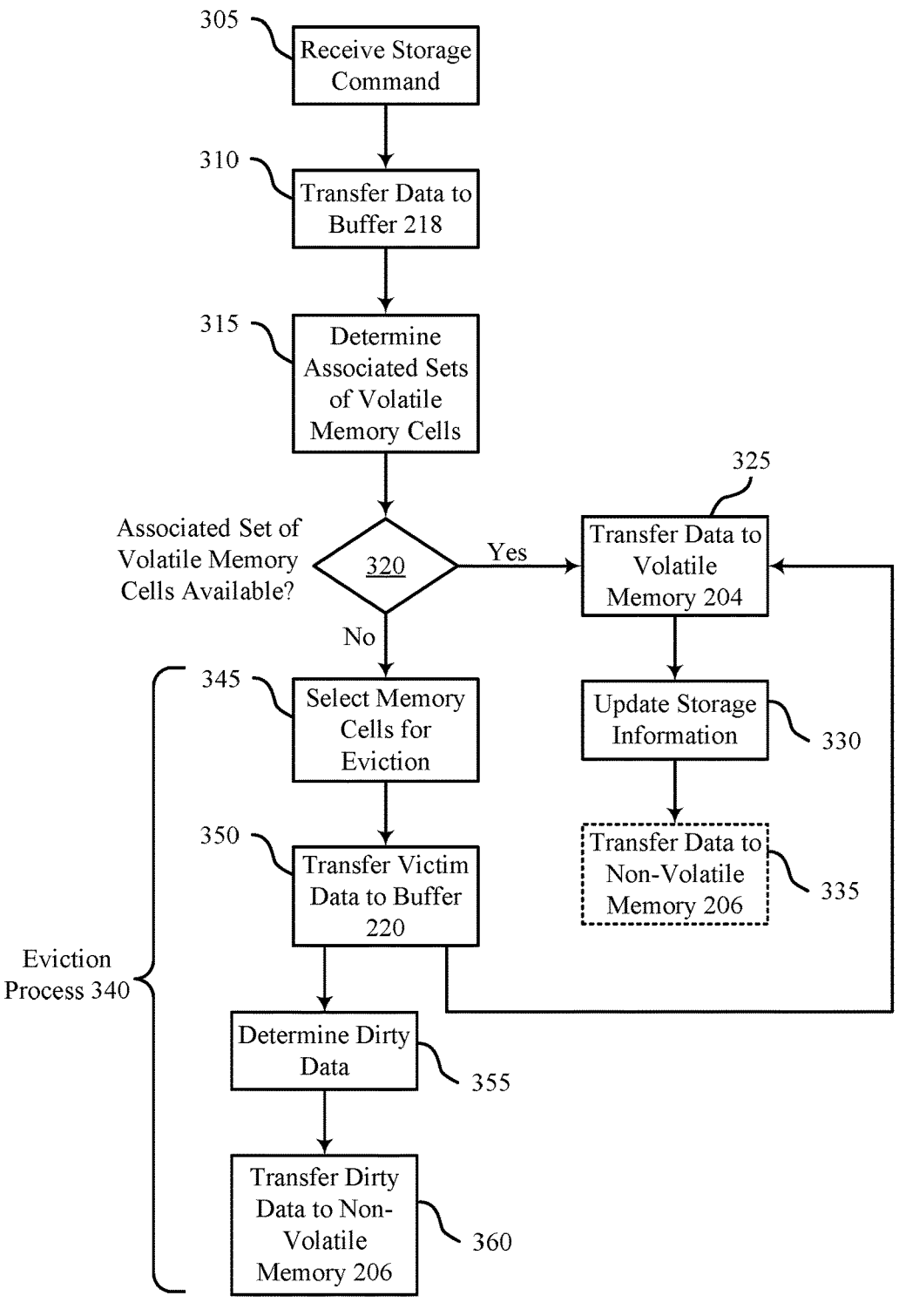
FIG. 3 illustrates an example of a process flow that supports cache management in a memory subsystem in accordance with examples as disclosed herein.

FIG. 3 illustrates an example of a process flow 300 that supports cache management in a memory subsystem in accordance with examples as disclosed herein. Process flow 300 may be an example of a process flow for a storage operation. Process flow 300 may be implemented by an interface controller 115 as described with reference to FIG. 1 or an interface controller 202 as described with reference to FIG. 2. For case of reference, the process flow 300 is described with reference to the memory subsystem 200. For example, aspects of the process flow 300 may be implemented by an interface controller, among other components. Additionally or alternatively, aspects of the process flow 300 may be implemented as instructions stored in memory (e.g., firmware stored in the volatile memory 120 and/or the non-volatile memory 125). For example, the instructions, when executed by a controller (e.g., the interface controller 115), may cause the controller to perform the operations of the process flow 300.

Alternative examples of the process flow 300 may be implemented in which some operations are performed in a different order than described or are not performed at all. In some cases, operations may include features not mentioned below, or additional operations may be added.

At 305, the interface controller 202 may receive from a host device a storage command that instructs the interface controller 202 to store data in the non-volatile memory 206. The storage command may include or be accompanied by a memory address that indicates the set of non-volatile memory cells targeted by the storage command (e.g., the set of non-volatile memory cells to which the data is to be written). The storage command and memory address may be received by command circuitry 230 via one or more of one or more of C/A bus 226, C/A bus interface 210, and decoder 228. At 310, the interface controller 202 may transfer the data to buffer 218, which may have a size (e.g., storage capacity) that corresponds to, or is equivalent to, the page size of volatile memory 204. In some examples, command circuitry 230 may initiate and facilitate the transfer of the data to buffer 218 (e.g., based on or in response to the received storage command). Alternatively, the data may be transferred automatically by data bus interface 208.

At 315, the interface controller 202 may determine n sets (e.g., sixteen sets) of volatile memory cells associated with the non-volatile memory address. To do so, the command circuitry 230 may select a set of the non-volatile memory address bits and transfer those bits to a cache management circuit set so that the register 256 can return storage information related to the non-volatile memory address. For example, register 256 may return storage information stored by memory array 252, which may be referenced based on the set of address bits. The storage information returned by register 256 may include content information (e.g., a tag address) that indicates which of the n associated sets of volatile memory cells, if any, is available to store the provided data. A set of volatile memory cells is considered to be available to store data if the set of volatile memory cells stores invalid data (e.g., random data). So, determining whether a set of associated volatile memory cells is available may include referencing the valid information stored in memory array 252 for the set of volatile memory cells. In some cases, an associated set of memory cells being available may be referred to as a "write hit."

At 320, interface controller 202 may determine whether one or more of the n associated sets of volatile memory cells are available to store data. As discussed, the interface controller 202 may determine the availability of the n associated sets of volatile memory cells based on storage information for the n associated sets of volatile memory cells. If one of the n associated sets of memory cells is available, the interface controller may, at 325, transfer the provided data from buffer 218 to the volatile memory 204 for storage in the available set of volatile memory cells.

At 330, the interface controller 202 may update the storage information for the set of volatile memory cells used to store the provided data. For instance, the interface controller 202 may update in memory array 252 the content information and validity information for the set of volatile memory cells. In some examples (e.g., when interface controller is operating in write-through mode), the interface controller 202 may, at 330, transfer the provided data to the targeted set of non-volatile memory cells for storage in non-volatile memory 206.

If, at 320, the interface controller determines that none of the n associated sets of memory cells is available (a scenario referred to as a "write miss"), the interface controller 202 may initiate (e.g., via engine 246-*a* and scheduler 248-*b*) an eviction process 340. For example, at 345 the interface controller 202 may select a one of the n associated sets of volatile memory cells for eviction. At 350, the interface controller 202 may transfer the victim data from the set of volatile memory cells selected for eviction to buffer 220. The transfer of victim data may from volatile memory 204 to buffer 220 may be facilitated by engine 246-*a* and scheduler 248-*b*. In some examples, the interface controller 202 may also transfer storage information (e.g., dirty information) for the set of volatile memory cells to register 258. After transferring the victim data to buffer 220, the interface controller 202 may proceed with parallel operations. For instance, the interface controller 202 may perform the operations between 325 and 335 while performing the remaining operations of eviction process 340.

At 355, the interface controller 202 may determine which subsets (e.g., which 32 B or 64 B) of the victim data are dirty (e.g., include dirty data). To do so the interface controller 202 (e.g., using engine 246-*b*) may reference dirty information (e.g., stored in register 258) for the subsets of victim data. As noted, dirty data may refer to data that is inconsistent with data in non-volatile memory 206. For instance, dirty data may be data that has been modified in volatile memory 204 since it was stored in non-volatile memory 206. Or dirty data may be data that was only written to volatile memory 204 (and not to non-volatile memory 206).

At 360, the interface controller 202 may transfer the subsets of dirty victim data from buffer 220 to non-volatile memory 206. For example, the subsets of dirty victim data may be transferred to the set of non-volatile memory cells associated with the victim data. The interface controller 202 may determine the correct set of non-volatile memory cells by referencing content information (e.g., tag information stored in memory array 252) for the set of volatile memory cells. Clean victim data (e.g., data that is consistent with corresponding data in non-volatile memory 206) may be discarded. In some examples, the transfer of dirty victim data from buffer 220 to non-volatile memory 206 may be facilitated by engine 246-*a* and scheduler 248-*a*. Thus, the interface controller 202 may satisfy a storage request from a host device.

Figure 4:
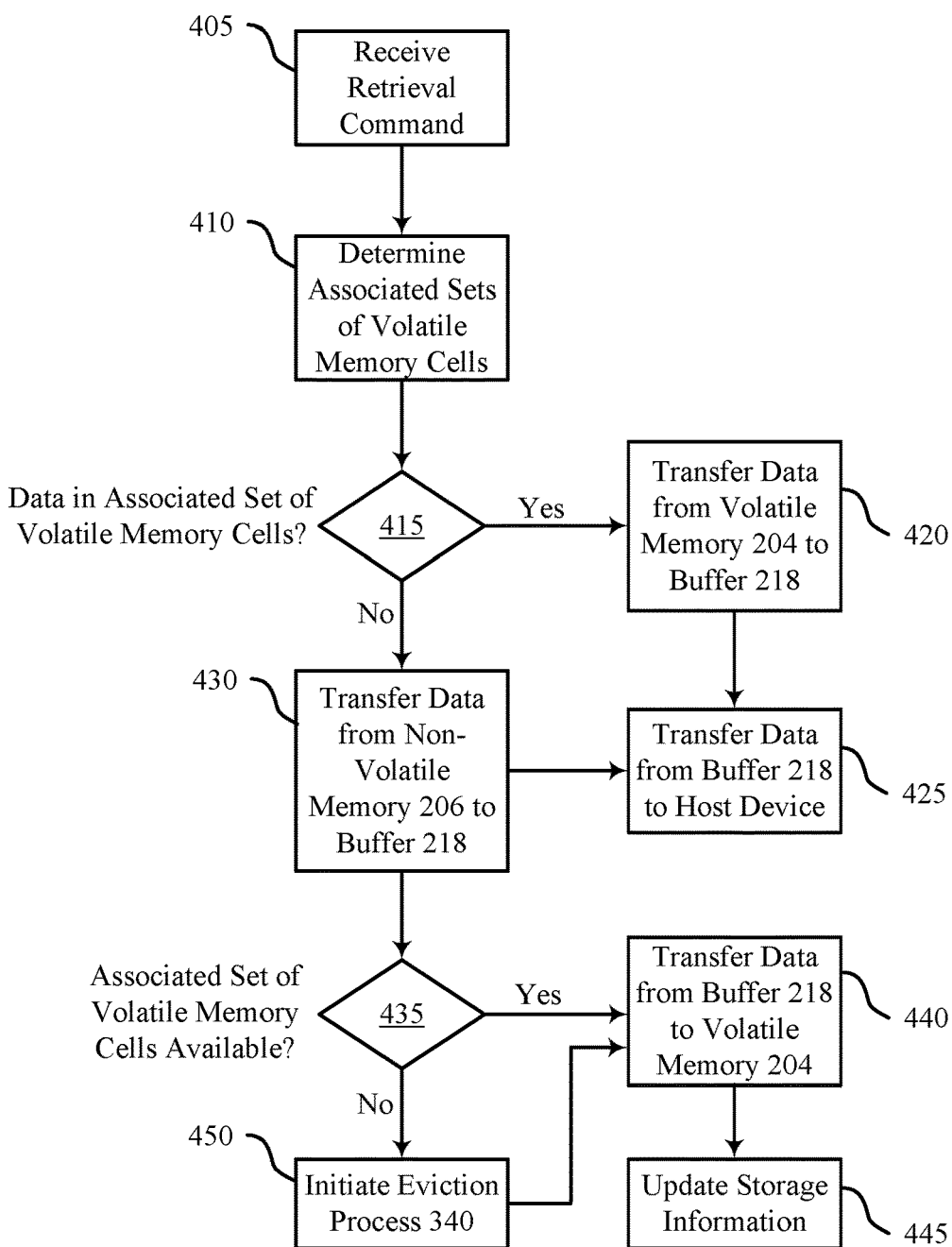
FIG. 4 illustrates an example of a process flow that supports cache management in a memory subsystem in accordance with examples as disclosed herein.

FIG. 4 illustrates an example of a process flow 400 that supports cache management in a memory subsystem in accordance with examples as disclosed herein. Process flow 400 may be an example of a process flow for a retrieval operation. Process flow 400 may be implemented by an interface controller 115 as described with reference to FIG. 1 or an interface controller 202 as described with reference to FIG. 2. For ease of reference, process flow 400 is described with reference to the memory subsystem 200. For example, aspects of the process flow 400 may be implemented by an interface controller, among other components. Additionally or alternatively, aspects of the process flow 400 may be implemented as instructions stored in memory (e.g., firmware stored in the volatile memory 120 and/or the non-volatile memory 125). For example, the instructions, when executed by a controller (e.g., the interface controller 115), may cause the controller to perform the operations of the process flow 400.

Alternative examples of the process flow 400 may be implemented in which some operations are performed in a different order than described or are not performed at all. In some cases, operations may include features not mentioned below, or additional operations may be added.

At 405, interface controller 202 may receive from a host device a retrieval command that instructs the interface controller 202 to retrieve data from non-volatile memory 206. The retrieval command may include or be accompanied by a memory address that indicates the set of non-volatile memory cells targeted by the retrieval command (e.g., the set of non-volatile memory cells from which the data is to be read). The retrieval command and memory address may be received by command circuitry 230 via one or more of C/A bus 226, C/A bus interface 210, and decoder 228.

At 410, the interface controller 202 may determine n sets (e.g., sixteen sets) of volatile memory cells associated with the non-volatile memory address. To do so, the command circuitry 230 may select a set of the non-volatile memory address bits and transfer those bits to a cache management circuit set so that the register 256 can return storage information related to the non-volatile memory address. For example, register 256 may return storage information stored by memory array 252, which may be referenced based on the set of address bits. The storage information returned by register 256 may include content information (e.g., a tag address) that indicates which of the n associated set of volatile memory cells, if any, stores the requested data.

At 415, the interface controller 202 may determine whether one or more of the n associated sets of volatile memory cells stores the requested data. As discussed, the interface controller 202 may determine whether the n associated sets of volatile memory cells store the requested data based on storage information for the n associated sets of volatile memory cells. If one of the n associated sets of volatile memory cells stores the requested data, the interface controller 202 may, at 420, transfer the requested data from volatile memory 204 to buffer 218 (e.g., by reading the set of memory cells and transferring the requested data via data buses 238, data bus interface 216, and memory interface circuitry 240). The interface controller 202 may then, at 425, transfer the requested data from buffer 218 to the host device (e.g., using data bus interface 208 and data bus 260).

If, at 415, the interface controller 202 determines that none of the n associated sets of volatile memory cells stores the requested data, the interface controller 202 may, at 430, transfer the requested data from non-volatile memory 206 to buffer 218. For instance, the interface controller 202 may prompt the requested data to be read from the targeted set of non-volatile memory cells and transferred to buffer 218 via one or more of data bus 232, data bus interface 212, and memory interface circuitry 234. The interface controller 202 may the proceed with the operations at 425 and 435. For example, at 435, the interface controller 202 may determine whether one or more of the n associated sets of volatile memory cells are available to store the requested data (e.g., for low latency retrieval in the future).

If one of the n associated sets of volatile memory cells is available, the interface controller may, at 440, transfer the requested data from buffer 218 to the volatile memory 204 for storage in the available set of volatile memory cells. The interface controller 202 may then, at 445, update the storage information for the set of volatile memory cells to which the data is written.

For instance, the interface controller 202 may update in memory array 252 the content information and validity information for the set of volatile memory cells. If, at 435, the interface controller determines that none of the n associated sets of memory cells are available, the interface controller 202 may, at 450, initiate an eviction process such as eviction process 340. After the eviction process 340 moves victim data from an associated set of volatile memory cells to buffer 220, the interface controller 202 may transfer the requested data from buffer 218 to the set of volatile memory cells in volatile memory 204. The memory controller may then, at 445, update the storage information for the set of volatile memory cells to which the requested data is written. Thus, the interface controller 202 may satisfy a retrieval request from a host device.

Figure 5:
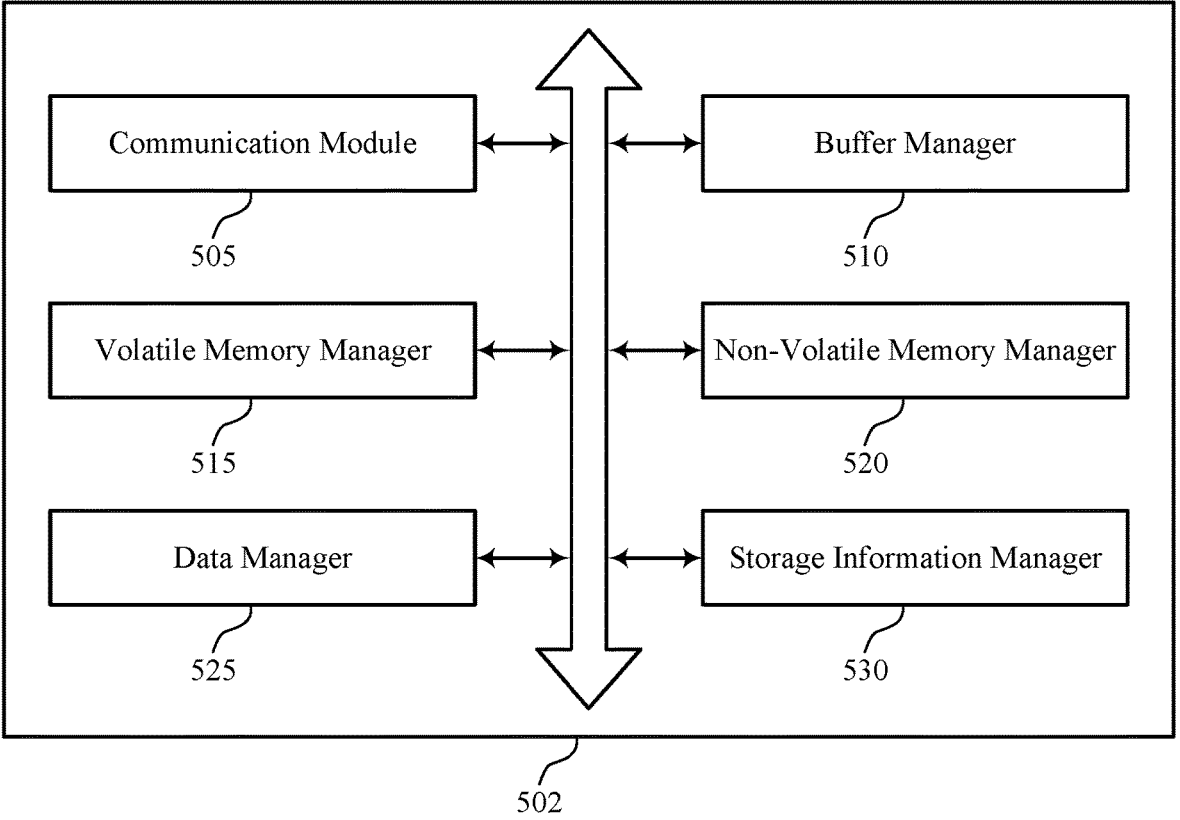
FIG. 5 shows a block diagram of a memory subsystem that supports cache management in accordance with aspects of the present disclosure.

FIG. 5 shows a block diagram 500 of a memory subsystem 502 that supports cache management in a memory subsystem in accordance with examples as disclosed herein. The memory subsystem 502 may be an example of aspects of a memory subsystem 110 or memory subsystem 200 as described with reference to FIGS. 1 and 2, respectively. Thus, the memory subsystem may be coupled with a host device, a volatile memory, and a non-volatile memory. The memory subsystem 502 may include a communication module 505, a buffer manager 510, a volatile memory manager 515, a non-volatile memory manager 520, a data manager 525, and a storage information manager 530. Each of these modules may include circuitry configured to perform the functions described herein. Each of these modules may communicate, directly or indirectly, with one another (e.g., via one or more buses or other conductive connections).

The memory subsystem 502 may be configured to perform access operations in response to access commands from the host device. In a first example, the memory subsystem 502 may be configured to service a storage command from the host device. For instance, the communication module 505 may be configured to receive a command from the host device to write data to a memory address of the non-volatile memory. The memory address may be associated with a set of memory cells in a bank of the volatile memory. The set of memory cells may be one of n sets of volatile memory cells associated with the memory address (e.g., in a set-associative mapping scheme). In some examples, the communication module 505 includes components of the interface controller 202 as described with reference to FIG. 2. For example, the communication module 505 may include aspects of the data bus 260, the transactional bus 222, the data bus interface 208, the C/A bus 226, the C/A bus interface 210, the decoder 228, or the command circuitry 230, among other components.

The buffer manager 510 may be configured to store the data in the buffer based at least in part on the command (e.g., in response to the command). In some examples, the buffer is an example of the buffer 218. Thus, the buffer may have a storage capacity corresponding to (e.g., equivalent to) the page size of the volatile memory. The buffer manager 510 may also be configured to determine, after storing the data in the buffer, storage information (e.g., content information, validity information) for the set of memory cells in the bank of the volatile memory. In some examples, the buffer manager 510 includes components of the interface controller 202 as described with reference to FIG. 2. For example, the buffer manager 510 may include aspects of the command circuitry 230, the cache management circuitry 244, and the buffer circuitry 224, among other components.

The volatile memory manager 515 may be configured to transfer the data from the buffer to the set of memory cells in the bank of the volatile memory based at least in part on the storage information for the set of memory cells. In some examples, the volatile memory manager 515 includes components of the interface controller 202 as described with reference to FIG. 2. For example, the volatile memory manager 515 may include aspects of the command circuitry 230, the engine 246-a, the scheduler 248-b, the buffer circuitry 224, and the memory interface circuitry 240, among other components.

In some examples, the buffer manager 510 may be configured to determine, based at least in part on the storage information, whether the set of memory cells stores second data. If the non-volatile memory manager 520 determines that the set of memory cells stores the second data, the non-volatile memory manager 520 may be configured to transfer, based at least in part on (e.g., in response to) the non-volatile memory manager 520 determining that the set of memory cells stores the second data, a subset (e.g., a 32 B or 64 B chunk) of the second data to the non-volatile memory. In some examples, the non-volatile memory manager 520 includes components of the interface controller 202 as described with reference to FIG. 2. For example, the non-volatile memory manager 520 may include aspects of the command circuitry 230, the engine 246-b, the scheduler 248-a, the buffer circuitry 224, and the memory interface circuitry 234, among other components.

In some examples, the interface controller of memory subsystem 502 includes a second buffer. In some examples, the second buffer is an example of the buffer 220. Thus, the second buffer may have a storage capacity corresponding to (e.g., equivalent to) the page size of the volatile memory. The volatile memory manager 515 may be configured to transfer the second data from the set of memory cells to the second buffer transferring the data from the buffer to the set of memory cells. The data manager 525 may be configured to determine whether the subset of the second data is different than corresponding data stored in the non-volatile memory (e.g., the data manager 525 may be configured to determine whether the subset of the second data is dirty). In some examples, the data manager 525 includes components of the interface controller 202 as described with reference to FIG. 2. For example, the data manager 525 may include aspects of the cache management circuitry 244, the engine 246-b, and the scheduler 248-a, the buffer circuitry 224, among other components. In some examples, (e.g., if the data manager 525 determines that the subset of data is different than the corresponding data) the non-volatile memory manager 520 may be configured to initiate a write operation to store the subset of the second data from the second buffer in the non-volatile memory based at least in part on (e.g., in response to) determining that the subset of the second data is different than the corresponding data. Thus, in some examples the non-volatile memory manager 520 may include aspects of the engine 246-b, scheduler 248-a, and memory interface circuitry 234, among other components.

In some examples, the interface controller of the memory subsystem 502 includes an array that stores storage information for subsets of memory cells in the bank of the volatile memory. In some examples, the array is an example of the memory array 254. The buffer manager 510 may be configured to select a set of address bits included in the command. In some examples the set of address bits is a portion of the memory address. The storage information manager 530 may be configured to reference, based at least in part on the set of address bits, the array that stores storage information for subsets of memory cells in the bank of the volatile memory. In such examples, transferring the subset of the second data to the non-volatile memory may be based at least in part on storage information for a subset of memory cells that stores the subset of the second data. In some examples, the storage information manager 530 includes components included in the interface controller 202 as described with reference to FIG. 2. For example, the storage information manager 530 may include aspects of the command circuitry 230 and the cache management circuitry 244, among other components.

In some examples, the buffer manager 510 is configured to determine, based at least in part on the storage information (e.g., based on the content and/or validity information), that the set of memory cells is available to store the data. The buffer manager 510 may also be configured to read the data from the buffer. The volatile memory manager 515 may be configured to initiate a write operation to store the data in the set of memory cells of the volatile memory.

In some examples, the interface controller of the memory subsystem 502 includes an array that stores storage information for the bank of the volatile memory. In some examples, the array is an example of the memory array 252. In some examples, the buffer manager 510 is configured to select a set of address bits included in the command. In some examples the set of address bits is a portion of the memory address. The storage information manager 530 may be configured to reference the array that stores storage information for the bank of the volatile memory based at least in part on the set of address bits. In such cases, the buffer manager 510 may be configured to determine the storage information based at least in part on referencing the array.

In some examples (e.g., in write-through mode), the non-volatile memory manager 520 may be configured to transfer the data from the buffer to the non-volatile memory based at least in part on the command from the host device. The non-volatile memory manager 520 may also be configured to initiate a write operation to store the data at the memory address.

As noted, the memory subsystem 502 may be configured to perform access operations in response to access commands from the host device. In a second example, the memory subsystem 502 may be configured to service a retrieval command from the host device. For instance, the communication module 505 may be configured to receive a command from the host device to read data from a memory address of the non-volatile memory. The memory address may be associated with a set of memory cells in a bank of the volatile memory. The set of memory cells may be one of n sets of volatile memory cells associated with the memory address (e.g., according to a set-associative mapping scheme). The buffer manager 510 may be configured to determine storage information for the set of memory cells in the bank of the volatile memory (e.g., in response to the command). The buffer manager 510 may also be configured to transfer, from the volatile memory or the non-volatile memory and based at least in part on the storage information for the set of memory cells, the data to the buffer (e.g., buffer 218) in the interface controller. The storage capacity of the buffer may correspond to the page size of the volatile memory.

In some examples, the buffer manager 510 may be configured to determine, based at least in part on the storage information, whether the set of memory cells in the volatile memory stores the data. In such examples, the volatile memory manager 515 may be configured to transfer the data to the buffer from the volatile memory based at least in part on the determination that the set of memory cells stores the data. The communication module 505 may be configured to transfer the data from the buffer to the host device.

In some examples, the buffer manager 510 may be configured to determine, based at least in part on the storage information, whether the set of memory cells in the volatile memory stores the data. In such examples, the non-volatile memory manager 520 may be configured to transfer the data to the buffer from the non-volatile memory based at least in part on the determination that the set of memory cells does not store the data. The communication module 505 may be configured to transfer the data from the buffer to the host device.

In some examples, the interface controller of the memory subsystem 502 includes a second buffer. In some examples, the second buffer is an example of the buffer 220. Thus, the buffer may have a storage capacity corresponding to the page size of the volatile memory. The buffer manager 510 may be configured to determine, based at least in part on the storage information, whether the set of memory cells in the volatile memory stores second data. The non-volatile memory manager 520 may be configured to transfer the data to the buffer from the non-volatile memory based at least in part on determining that the set of memory cells stores the second data. The buffer manager 510 may be configured to transfer the second data from the set of memory cells in the volatile memory to the second buffer in the interface controller. In some examples, the non-volatile memory manager 520 is configured to transfer a subset of the second data from the second buffer to the non-volatile memory based at least in part on the subset of the second data being different than corresponding data stored in the non-volatile memory. The volatile memory manager 515 may be configured to transfer the data from the buffer to the set of memory cells in the volatile memory.

In some examples, the buffer manager 510 may be configured to select a set of address bits included in the command. The storage information manager 530 may be configured to reference an array that stores storage information for the bank of the volatile memory based at least in part on the set of address bits, where the storage information is determined based at least in part on referencing the array.

As noted, the memory subsystem 502 may be configured to perform access operations in response to access commands from the host device. In a third example, the memory subsystem may include an FeRAM coupled with an interface controller and a DRAM coupled with the interface controller. The interface controller may include an SRAM buffer that is coupled with the DRAM and the FeRAM and that has a storage capacity corresponding to the page size of the DRAM. The communication module 505 may be configured to receive a command from the host device (e.g., an SoC or processor) to access a memory address of the FeRAM. The memory address may be associated with a set of memory cells in a bank of the DRAM. The buffer manager 510 may be configured to store data associated with the command (e.g., requested data or provided data) in the SRAM buffer. The buffer manager 510 may also be configured to transfer the data from the SRAM buffer based at least in part on the command.

In some examples, the interface controller includes a second SRAM buffer that has a capacity corresponding to the page size of the DRAM. The volatile memory manager 515 may be configured to transfer second data from the set of memory cells in the DRAM to the second SRAM buffer. The non-volatile memory manager 520 may be configured to transfer the second data from the second SRAM buffer to the FeRAM. If the command is a read command, the buffer manager 510 may be configured to determine whether the set of memory cells in the DRAM is storing the second data. The non-volatile memory manager 520 may be configured to transfer the data from the FeRAM to the SRAM buffer based at least in part on determining that the set of memory cells in the DRAM is storing the second data. And the volatile memory manager 515 may be configured to transfer the data from the SRAM buffer to the set of memory cells in the DRAM after the second data is transferred from the set of memory cells in the DRAM to the second SRAM buffer.

If the command is a write command for the data, the non-volatile memory manager 520 may be configured to transfer the data to the FeRAM for storage at the memory address. The buffer manager 510 may be configured to determine whether the set of memory cells in the DRAM is storing the second data. And the volatile memory manager 515 may be configured to transfer the data from the SRAM buffer to the set of memory cells in the DRAM after the second data is transferred from the set of memory cells in the DRAM to the second SRAM buffer, where the data is transferred from the SRAM buffer to the set of memory cells in the DRAM based at least in part on determining that the set of memory cells in the DRAM is storing the second data.

FIG. 6 shows a flowchart illustrating a method or methods 600 that supports cache management in a memory subsystem in accordance with aspects of the present disclosure.

The operations of method 600 may be implemented by a memory subsystem or its components as described herein. For example, the operations of method 600 may be performed by a memory subsystem as described with reference to FIGS. 1 through 5. In some examples, a memory subsystem may execute a set of instructions to control the functional elements of the memory subsystem to perform the described functions. Additionally or alternatively, a memory subsystem may perform aspects of the described functions using special-purpose hardware.

In some examples, the operations of method 600 may be implemented by an apparatus that includes an interface controller, a non-volatile memory coupled with the interface controller, and a volatile memory coupled with the interface controller. The interface controller may include a buffer.

At 605, the method may include receiving a command from a host device to write data to a memory address of the non-volatile memory. The memory address may be associated with a set of memory cells in a bank of the volatile memory. The operations of 605 may be performed according to the methods described herein. In some examples, aspects of the operations of 605 may be performed by a communication module as described with reference to FIG. 5.

At 610, the method may include storing the data in the buffer based at least in part on the command, the buffer having a storage capacity corresponding to a page size of the volatile memory. The operations of 610 may be performed according to the methods described herein. In some examples, aspects of the operations of 610 may be performed by a buffer manager as described with reference to FIG. 5.

At 615, the method may include determining, after storing the data in the buffer, storage information for the set of memory cells in the bank of the volatile memory. The operations of 615 may be performed according to the methods described herein. In some examples, aspects of the operations of 615 may be performed by a buffer manager as described with reference to FIG. 5.

At 620, the method may include transferring the data from the buffer to the set of memory cells in the bank of the volatile memory based at least in part on the storage information for the set of memory cells. The operations of 620 may be performed according to the methods described herein. In some examples, aspects of the operations of 620 may be performed by volatile memory manager as described with reference to FIG. 5.

In some examples, an apparatus as described herein may perform a method or methods, such as the method 600. The apparatus may include features, means, or instructions (e.g., a non-transitory computer-readable medium storing instructions executable by a processor) for receiving a command from a host device to write data to a memory address of the non-volatile memory, the memory address associated with a set of memory cells in a bank of the volatile memory; storing the data in the buffer based at least in part on the command, the buffer having a storage capacity corresponding to a page size of the volatile memory; determining, after storing the data in the buffer, storage information for the set of memory cells in the bank of the volatile memory; and transferring the data from the buffer to the set of memory cells in the bank of the volatile memory based at least in part on the storage information for the set of memory cells.

Some examples of the method 600 and the apparatus described herein may further include operations, features, means, or instructions for determining, based at least in part on the storage information, whether the set of memory cells stores second data; and transferring, based at least in part on determining that the set of memory cells stores the second data, a subset of the second data to the non-volatile memory.

Some examples of the method 600 and the apparatus described herein may further include operations, features, means, or instructions for transferring the second data from the set of memory cells to a second buffer included in the interface controller before transferring the data from the buffer to the set of memory cells; determining whether the subset of the second data is different than corresponding data stored in the non-volatile memory; and initiating a write operation to store the subset of the second data from the second buffer in the non-volatile memory based at least in part on determining that the subset of the second data is different than the corresponding data.

Some examples of the method 600 and the apparatus described herein may further include operations, features, means, or instructions for selecting a set of address bits included in the command; and referencing, based at least in part on the set of address bits, an array (included in the interface controller) that stores storage information for subsets of memory cells in the bank of the volatile memory, where transferring the subset of the second data to the non-volatile memory is based at least in part on storage information for a subset of memory cells that stores the subset of the second data.

Some examples of the method 600 and the apparatus described herein may further include operations, features, means, or instructions for determining, based at least in part on the storage information, that the set of memory cells is available to store the data; reading the data from the buffer; and initiating a write operation to store the data in the set of memory cells of the volatile memory.

Some examples of the method 600 and the apparatus described herein may further include operations, features, means, or instructions for selecting a set of address bits included in the command; and referencing an array (included in the interface controller) that stores storage information for the bank of the volatile memory based at least in part on the set of address bits, where the storage information is determined based at least in part on referencing the array.

Some examples of the method 600 and the apparatus described herein may further include operations, features, means, or instructions for transferring the data from the buffer to the non-volatile memory based at least in part on the command from the host device; and initiating a write operation to store the data at the memory address. In some examples, the host device is an SoC or processor.

FIG. 7 shows a flowchart illustrating a method or methods 700 that supports cache management in a memory subsystem in accordance with aspects of the present disclosure. The operations of method 700 may be implemented by a memory subsystem or its components as described herein. For example, the operations of method 700 may be performed by a memory subsystem as described with reference to FIGS. 1 through 5. In some examples, a memory subsystem may execute a set of instructions to control the functional elements of the memory subsystem to perform the described functions. Additionally or alternatively, a memory subsystem may perform aspects of the described functions using special-purpose hardware.

In some examples, the operations of method 700 may be implemented by an apparatus that includes an interface controller, a non-volatile memory coupled with the interface controller, and a volatile memory coupled with the interface controller. The interface controller may include a buffer.

At 705, the method may include receiving a command from a host device to read data from a memory address of the non-volatile memory. The memory address may be associated with a set of memory cells in a bank of the volatile memory. The operations of 705 may be performed according to the methods described herein. In some examples, aspects of the operations of 705 may be performed by a communication module as described with reference to FIG. 5.

At 710, the method may include determining storage information for the set of memory cells in the bank of the volatile memory. The operations of 710 may be performed according to the methods described herein. In some examples, aspects of the operations of 710 may be performed by a buffer manager as described with reference to FIG. 5.

At 715, the method may include transferring, from the volatile memory or the non-volatile memory and based at least in part on the storage information for the set of memory cells, the data to the buffer in the interface controller, the buffer having a storage capacity corresponding to a page size of the volatile memory. The operations of 715 may be performed according to the methods described herein. In some examples, aspects of the operations of 715 may be performed by a buffer manager as described with reference to FIG. 5.

In some examples, an apparatus as described herein may perform a method or methods, such as the method 700. The apparatus may include features, means, or instructions (e.g., a non-transitory computer-readable medium storing instructions executable by a processor) receiving a command from a host device to read data from a memory address of the non-volatile memory, the memory address associated with a set of memory cells in a bank of the volatile memory; determining storage information for the set of memory cells in the bank of the volatile memory; and transferring, from the volatile memory or the non-volatile memory and based at least in part on the storage information for the set of memory cells, the data to the buffer in the interface controller, the buffer having a storage capacity corresponding to a page size of the volatile memory.

In some examples of the method 700 and the apparatus described herein, determining the storage information may include operations, features, means, or instructions for determining, based at least in part on the storage information, whether the set of memory cells in the volatile memory stores the data, where the data is transferred to the buffer from the volatile memory based at least in part on determining that the set of memory cells stores the data; and transferring the data from the buffer to the host device.

In some examples of the method 700 and the apparatus described herein, determining the storage information may include operations, features, means, or instructions for determining, based at least in part on the storage information, whether the set of memory cells in the volatile memory stores the data, where the data is transferred to the buffer from the non-volatile memory based at least in part on determining that the set of memory cells does not store the data; and transferring the data from the buffer to the host device.

In some examples of the method 700 and the apparatus described herein, determining the storage information may include operations, features, means, or instructions for determining, based at least in part on the storage information, whether the set of memory cells in the volatile memory stores second data, where the data is transferred to the buffer from the non-volatile memory based at least in part on determining that the set of memory cells stores the second data; and transferring the second data from the set of memory cells in the volatile memory to a second buffer in the interface controller, the second buffer having a storage capacity corresponding to the page size of the volatile memory. In some examples of the method 700 and the apparatus described herein, determining the storage information may include operations, features, means, or instructions for transferring a subset of the second data from the second buffer to the non-volatile memory based at least in part on the subset of the second data being different than corresponding data stored in the non-volatile memory; and transferring the data from the buffer to the set of memory cells in the volatile memory.

In some examples of the method 700 and the apparatus described herein, determining the storage information may include operations, features, means, or instructions for selecting a set of address bits included in the command; and referencing an array that stores storage information for the bank of the volatile memory based at least in part on the set of address bits, where the storage information is determined based at least in part on referencing the array.

FIG. 8 shows a flowchart illustrating a method or methods 800 that supports cache management in a memory subsystem in accordance with aspects of the present disclosure. The operations of method 800 may be implemented by a memory subsystem or its components as described herein. For example, the operations of method 800 may be performed by a memory subsystem as described with reference to FIGS. 1 through 5. In some examples, a memory subsystem may execute a set of instructions to control the functional elements of the memory subsystem to perform the described functions. Additionally or alternatively, a memory subsystem may perform aspects of the described functions using special-purpose hardware.

In some examples, the operations of method 800 may be implemented by an apparatus that includes an interface controller, an FeRAM coupled with the interface controller, and a DRAM memory coupled with the interface controller. The interface controller may include an SRAM buffer.

At 805, the method may include receiving a command from an SoC to access a memory address of the FeRAM, the memory address associated with a set of memory cells in a bank of the DRAM. The operations of 805 may be performed according to the methods described herein. In some examples, aspects of the operations of 805 may be performed by a communications module as described with reference to FIG. 5.

At 810, the method may include storing data associated with the command in the SRAM buffer, the SRAM buffer having a storage capacity corresponding to page size of the DRAM and coupled with the DRAM and the FeRAM. The operations of 810 may be performed according to the methods described herein. In some examples, aspects of the operations of 810 may be performed by a buffer manager as described with reference to FIG. 5.

At 815, the method may include transferring the data from the SRAM buffer based at least in part on the command. The operations of 815 may be performed according to the methods described herein. In some examples, aspects of the operations of 815 may be performed by a buffer manager as described with reference to FIG. 5.

In some examples, an apparatus as described herein may perform a method or methods, such as the method 800. The apparatus may include features, means, or instructions (e.g., a non-transitory computer-readable medium storing instructions executable by a processor) for receiving a command from an SoC to access a memory address of the FeRAM, the memory address associated with a set of memory cells in a bank of the DRAM; storing data associated with the command in the SRAM buffer, the SRAM buffer having a storage capacity corresponding to page size of the DRAM and coupled with the DRAM and the FeRAM; and transferring the data from the SRAM buffer based at least in part on the command.

Some examples of the method 800 and the apparatus described herein may further include operations, features, means, or instructions for transferring second data from the set of memory cells in the DRAM to a second SRAM buffer included in the interface controller, the second SRAM buffer having a capacity corresponding to the page size of the DRAM; and transferring the second data from the second SRAM buffer to the FeRAM.

Some examples of the method 800 and the apparatus described herein may further include operations, features, means, or instructions for determining, when the command is a read command, whether the set of memory cells in the DRAM is storing the second data; transferring the data from the FeRAM to the SRAM buffer based at least in part on determining that the set of memory cells in the DRAM is storing the second data; and transferring the data from the SRAM buffer to the set of memory cells in the DRAM after the second data is transferred from the set of memory cells in the DRAM to the second SRAM buffer.

Some examples of the method 800 and the apparatus described herein may further include operations, features, means, or instructions for transferring, when the command is a write command, the data to the FeRAM for storage at the memory address; determining whether the set of memory cells in the DRAM is storing the second data; and transferring the data from the SRAM buffer to the set of memory cells in the DRAM after the second data is transferred from the set of memory cells in the DRAM to the second SRAM buffer, where the data is transferred from the SRAM buffer to the set of memory cells in the DRAM based at least in part on determining that the set of memory cells in the DRAM is storing the second data.

In some examples, an apparatus as described herein may perform aspects of method 600, method 700, and method 800. The apparatus may include a non-volatile memory (e.g., the non-volatile memory 125 or the non-volatile memory 206), a volatile memory (e.g., the volatile memory 120 or the volatile memory 204), and an interface controller (e.g., the interface controller 115 or the interface controller 202). The interface controller may include a first buffer (e.g., buffer 135-a or buffer 218) coupled with the bank of the volatile memory, the first buffer having a capacity corresponding to a page size of the volatile memory and configured to store data indicated by an access command; and a second buffer (e.g., buffer 135-b or buffer 220) coupled with the bank of the volatile memory, the second buffer having the capacity corresponding to the page size of the volatile memory and configured to store data for transfer between the volatile memory and the non-volatile memory.

In some examples, the volatile memory includes a plurality of banks, and the interface controller includes a first plurality of buffers comprising the first buffer, where each buffer in the first plurality of buffers is coupled with a respective bank of the plurality of banks and configured to store data indicated by access commands for the respective bank; and a second plurality of buffers comprising the second buffer, where each buffer in the second plurality of buffers is coupled with a respective bank of the plurality of banks and configured to store data for transfer between the respective bank and the non-volatile memory.

In some examples, the apparatus includes a circuit (e.g., command circuitry 230) coupled with a bus (e.g., C/A bus 226) between the interface controller and a host device. The circuit may be configured to receive commands and addresses from the host device over the bus and configured to issue commands to one or more circuits (e.g., scheduler 248-a, scheduler 248-b) that control access to the volatile memory and non-volatile memory.

In some examples, the apparatus includes a first array (e.g., memory array 252) configured to store storage information for sets of memory cells in the bank of the volatile memory; and a second array (e.g., memory array 254) coupled with the first array and configured to store update information for subsets of memory cells of the sets of memory cells.

In some examples, the interface controller includes a first circuit (e.g., memory interface circuitry 234) coupled with the non-volatile memory. The first circuit may be configured to issue commands to the non-volatile memory and transfer data between the non-volatile memory and the first and second buffers; and a second circuit (e.g., memory interface circuitry 240) coupled with the volatile memory, the second circuit configured to issue commands to the volatile memory and transfer data between the volatile memory and the first and second buffers.

In some examples, the interface controller, the first buffer, and the second buffer are on a first die, the volatile memory is on a second die, and the non-volatile memory is on a third die. In some examples, the non-volatile memory, the volatile memory, and the interface controller are in a same package.

It should be noted that the methods described above describe possible implementations, and that the operations and the steps may be rearranged or otherwise modified and that other implementations are possible. Furthermore, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

A protocol may define one or more communication procedures and one or more communication parameters supported for use by a device or component. For example, a protocol may define various operations, a timing and a frequency for those operations, a meaning of various commands or signals or both, one or more addressing scheme(s) for one or more memories, a type of communication for which pins are reserved, a size of data handled at various components such as interfaces, a data rate supported by various components such as interfaces, or a bandwidth supported by various components such as interfaces, among other parameters and metrics, or any combination thereof. Use of a shared protocol may enable interaction between devices because each device may operate in a manner expected, recognized, and understood by another device. For example, two devices that support the same protocol may interact according to the policies, procedures, and parameters defined by the protocol, whereas two devices that support different protocols may be incompatible.

To illustrate, two devices that support different protocols may be incompatible because the protocols define different addressing schemes (e.g., different quantities of address bits). As another illustration, two devices that support different protocols may be incompatible because the protocols define different transfer procedures for responding to a single command (e.g., the burst length or quantity of bytes permitted in response to the command may differ). Merely translating a command to an action should not be construed as use of two different protocols. Rather, two protocols may be considered different if corresponding procedures or parameters defined by the protocols vary. For example, a device may be said to support two different protocols if the device supports different addressing schemes, or different transfer procedures for responding to a command.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A system, comprising:
a non-volatile memory;
a volatile memory comprising a plurality of banks; and
a controller coupled with the non-volatile memory and the volatile memory, the controller comprising a plurality of first buffers and a plurality of second buffers, each bank of the plurality of banks associated with a respective first buffer of the plurality of first buffers and a respective second buffer of the plurality of second buffers, the controller operable to cause the system to:
receive a command to store first data in the non-volatile memory;
store the first data, based on receiving the command, in a first buffer of the plurality of first buffers; and
transfer the first data, based on an availability of the volatile memory to store data, from the first buffer to a bank of the plurality of banks of the volatile memory that is associated with the first buffer.

2. The system of claim 1, wherein each of the plurality of first buffers and each of the plurality of second buffers has a storage capacity that is equal to a page size of the volatile memory.

3. The system of claim 1, wherein the controller is further operable to cause the system to:
determine that a portion of the volatile memory is unavailable to store data; and
transfer second data from the volatile memory to a second buffer of the plurality of second buffers based on the determination, wherein transferring the first data is performed after transferring the second data.

4. The system of claim 3, wherein the controller is further operable to cause the system to:
determine that the second data is different than corresponding data stored in the non-volatile memory; and
transfer the second data to the non-volatile memory based on determining that the second data is different than corresponding data stored in the non-volatile memory.

5. The system of claim 1, wherein the controller is further operable to cause the system to:
update content and validity information for the volatile memory based on the transfer of the first data to the bank of the volatile memory; and
transfer the first data from the bank of the volatile memory to the non-volatile memory.

6. The system of claim 1, wherein the availability of the volatile memory to store data is based on a comparison of a quantity of memory cells of the volatile memory to a quantity of memory cells of the non-volatile memory targeted by the command.

7. The system of claim 1, wherein the plurality of first buffers and the plurality of second buffers are on a first die, the volatile memory is on a second die, and the non-volatile memory is on a third die.

8. A system, comprising:
a non-volatile memory;
a volatile memory comprising a plurality of banks; and
a controller coupled with the non-volatile memory and the volatile memory, the controller comprising a plurality of first buffers and a plurality of second buffers, each bank of the plurality of banks associated with a respective first buffer of the plurality of first buffers and a respective second buffer of the plurality of second buffers, the controller operable to cause the system to:

receive a command to retrieve first data from the non-volatile memory;

determine whether the volatile memory stores the first data; and transfer the first data from a first buffer of the plurality of first buffers to a host device based on the determination.

9. The system of claim 8, wherein each of the plurality of first buffers and each of the plurality of second buffers has a storage capacity that is equal to a page size of the volatile memory.

10. The system of claim 8, wherein the controller is further operable to cause the system to:

determine that the volatile memory stores the first data; and transfer the first data from the volatile memory to the first buffer based on the determination that the volatile memory stores the first data.

11. The system of claim 8, wherein the controller is further operable to cause the system to:

determine that the volatile memory does not store the first data; and transfer the first data from the non-volatile memory to the first buffer based on the determination that the volatile memory does not store the first data.

12. The system of claim 11, wherein the controller is further operable to cause the system to:

determine an availability of the volatile memory to store the first data; and transfer the first data from the first buffer to the volatile memory based on the determination of the availability of the volatile memory.

13. The system of claim 12, wherein the controller is further operable to cause the system to:

update content and validity information for the volatile memory based on transferring the first data from the first buffer to the volatile memory.

14. The system of claim 11, wherein the controller is further operable to cause the system to:

determine that a portion of the volatile memory is unavailable to store data; and transfer second data from the volatile memory to a second buffer of the plurality of second buffers based on determining that the portion of the volatile memory is unavailable to store data, wherein transferring the first data is performed after the transfer of the second data.

15. A method, comprising:

receiving, at a system that includes a non-volatile memory, a volatile memory comprising a plurality of banks, a plurality of first buffers, and a plurality of second buffers, each of the plurality of banks associated with a respective first buffer of the plurality of first buffers and a respective second buffer of the plurality of second buffers, a command to store first data in the non-volatile memory;

storing the first data, based on receiving the command, in a first buffer of the plurality of first buffers; and transferring the first data based on an availability of the volatile memory to store data, from the first buffer to a bank of plurality of banks of the volatile memory that is associated with the first buffer.

16. The method of claim 15, wherein each of the plurality of first buffers and each of the plurality of second buffers has a storage capacity that is equal to a page size of the volatile memory.

17. The method of claim 15, further comprising:

determining that a portion of the volatile memory is unavailable to store data; and transferring second data from the volatile memory to a second buffer of the plurality of second buffers based on the determination, wherein transferring the first data is performed after transferring the second data.

18. The method of claim 17, further comprising:

determining that the second data is different than corresponding data stored in the non-volatile memory; and transferring the second data to the non-volatile memory based on determining that the second data is different than corresponding data stored in the non-volatile memory.

19. The method of claim 15, further comprising:

updating content and validity information for the volatile memory based on the transfer of the first data to the bank of the volatile memory; and transferring the first data from the bank of the volatile memory to the non-volatile memory.

20. The method of claim 15, wherein the availability of the volatile memory to store data is based on a comparison of a quantity of memory cells of the volatile memory to a quantity of memory cells of the non-volatile memory targeted by the command.

* * * * *